United States Patent
Nagayama et al.

(10) Patent No.: US 9,450,473 B2
(45) Date of Patent: Sep. 20, 2016

(54) MOTOR FOR VEHICLE AND RAILWAY VEHICLE

(71) Applicant: KABUSHIKI KAISHA TOSHIBA, Tokyo (JP)

(72) Inventors: Takashi Nagayama, Kanagawa (JP); Aki Onuma, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 303 days.

(21) Appl. No.: 14/181,464

(22) Filed: Feb. 14, 2014

(65) Prior Publication Data

US 2015/0000549 A1 Jan. 1, 2015

(30) Foreign Application Priority Data

Jun. 27, 2013 (JP) .................................. 2013-135502

(51) Int. Cl.
*H02K 9/00* (2006.01)
*H02K 9/06* (2006.01)
*B61C 9/50* (2006.01)

(52) U.S. Cl.
CPC .. *H02K 9/06* (2013.01); *B61C 9/50* (2013.01)

(58) Field of Classification Search
CPC ............. H02K 9/02; H02K 9/04; H02K 9/06
See application file for complete search history.

(56) References Cited

U.S. PATENT DOCUMENTS

| | | | | |
|---|---|---|---|---|
| 2012/0212086 A1* | 8/2012 | Nagayama | ......... | H02K 11/0021 310/59 |
| 2013/0076172 A1* | 3/2013 | Koyama | .................. | H02K 9/06 310/63 |
| 2013/0119796 A1* | 5/2013 | Maeda | ...................... | H02K 9/06 310/63 |
| 2013/0181559 A1* | 7/2013 | Kaneko | ................ | H02K 5/1732 310/90 |
| 2015/0000549 A1* | 1/2015 | Nagayama | ................ | B61C 9/50 104/288 |
| 2015/0236561 A1* | 8/2015 | Aso | .......... | H02K 5/22 310/43 |
| 2015/0303765 A1* | 10/2015 | Akiyoshi | ................ | H02K 9/06 310/59 |
| 2015/0340929 A1* | 11/2015 | Aso | .......... | H02K 5/15 417/423.8 |

FOREIGN PATENT DOCUMENTS

| | | |
|---|---|---|
| JP | 2006-180684 A | 7/2006 |
| JP | 2006-314183 A | 11/2006 |
| JP | 2010-220417 A | 9/2010 |

* cited by examiner

*Primary Examiner* — Jason C Smith
(74) *Attorney, Agent, or Firm* — Patterson & Sheridan, LLP

(57) ABSTRACT

According to one embodiment, a motor for a vehicle includes a casing accommodating a rotor and a stator iron core inside thereof, and supporting each of both axial ends of the rotor shaft via a bearing, an air inlet port formed in a portion of the casing outside the bearing in the radial direction, and a fan provided between the rotor iron core and the bearing and rotating with the rotor shaft, wherein a portion of the casing positioned outside impellers of the fan in the axial direction forms a first housing and a second housing constituting a discharge channel, and the first housing includes a guide wall extending toward the outside in the radial direction, and the second housing includes a thinned wall portion located inside the guide wall in the axial direction to constitute the discharge channel between the thin wall portion and the guide wall.

20 Claims, 18 Drawing Sheets

MOTOR FOR VEHICLE AND RAILWAY VEHICLE

CROSS-REFERENCE TO RELATED APPLICATION

This application is based upon and claims the benefit of priority from Japanese Patent Application No. 2013-135502, filed Jun. 27, 2013, the entire contents of which are incorporated herein by reference.

FIELD

Embodiments described herein relate to a motor for a vehicle and a railway vehicle.

BACKGROUND

According to a typical railway vehicle, running (moving) of the vehicle is realized by a rotational force which is generated from a main motor (hereinafter abbreviated as a "motor") attached to a truck disposed below a floor of the vehicle body, and transmitted to wheels of the truck via a joint (coupling) and a gear unit (gear box).

This type of motor in related art is chiefly constituted by an inductive motor which includes a cage rotor provided with a rotary iron core, a plurality of rotor bars embedded in the rotary iron core, and a short-circuit ring which connects extended portions of the respective rotor bars projected from the rotary iron core in the axial direction of a rotor shaft and combines the extended portions into one electrical body.

This inductive motor often has a so-called fully enclosed structure which separates the interior of the motor containing the rotor bars, coils constituting a stator, and other electrical parts from outside air. This structure adopts such a cooling system for a motor known in the art which achieves cooling not by introduction of the outside air into the motor but by airflow of the outside air, the flow caused by two fans rotating with the rotor shaft, without introducing the outside air into the electrically and magnetically cooperating motor components within the enclosure of the fully enclosed structure.

For example, an inductive motor in related art includes two fans: one positioned between an iron core supporting member for supporting the rotary iron core and one of a pair of bearings for supporting both ends of the rotor shaft in such a manner that the rotor shaft can freely rotate; and the other positioned between the iron core supporting member and the other bearing. Each of the fans includes a plurality of impellers provided almost radially on the surface of the fan facing to the outside in the axial direction. The outer circumferential edge of each of the fans is opposed to a housing separating the interior of the motor from the outside with an extremely small clearance between the edge of the fan and the housing, in which clearance a labyrinth seal structure is formed. According to the inductive motor thus constructed, the rotary area and the stationary area are partitioned, constituting the so-called fully enclosed structure as noted above where the interior components of the motor is separated from the outside air.

A part of each housing overlies, and thus covers, the fan in the axial direction. This part of the housing forms a shroud over the interior, fully sealed enclosure, portion of the motor, to form a cooling passage between the shroud and the sealed enclosure. An air inlet port is formed in a portion of the housing overlying the fan forming an inlet port positioned in the vicinity of the bearing on the driving side of the motor, to allow outside air to flow within the cooling passage past, and cool, the bearing and a side of the stator adjacent thereto. This air inlet port communicates, through an air channel formed within the housing, with an air channel which extends through a stator iron core of the stator in the axial direction, to cool the stator.

An air inlet port and an air outlet port are further formed in the housing covering the axial outside portion of the fan on the other bearing side. Again, a portion of the housing forms a shroud spaced from the sealed enclosure of the motor, to form a cooling passage/air channel therebetween. The inlet and outlet ports are formed as openings in the shroud located in the vicinity of the other bearing.

When the rotor shaft of the inductive motor thus constructed rotates, the fans rotate accordingly. As a result, outside air is introduced through the air inlet ports by a suction force generated by the impellers formed on the fans. Then, on the one bearing side, the outside air introduced via the air inlet port sequentially flows as cooling air through the air channel within the housing and the air channel within the stator iron core, and then exits through the outlet. During this process, cooling for the one bearing, cooling for the coils via the stator iron core, and cooling for the rotor bars via the fan, the iron core supporting member, and the rotor iron core can be simultaneously achieved.

On the other bearing side, the outside air introduced through the air inlet port flows toward the air outlet port as cooling air, and then goes out for discharge. During this process, cooling for the other bearing, and cooling for the rotor bars via the fan, the iron core supporting member, and the rotor iron core can be simultaneously achieved.

The structure which cools the respective components by using the fans discharges the outside air via the air channels or the air outlet port to the exterior of the housing after introducing and utilizing the outside air as cooling air, and therefore generates noise in the process. When the vehicle speed increases, the number of revolutions of the motor increases, in which condition noise generation easily occurs. Particularly, the air outlet port for the fan on the other bearing side located on the side opposite to the coupling in the axial direction is located in the vicinity of the corresponding fan, i.e., the impellers are directly exposed to the external environment through the exhaust port. In this case, the wind noise generated by the rotation of the impellers is emitted via the air outlet port to the outside in such a manner as to directly diffuse in a substantially sectored shape, in other words, along a cone shape formed at the edges of the line of sight to the impeller through the discharge opening. In contrast, the air exhaust from the driving side of the motor crosses the motor and exhaust at the non-driving side of the motor, remote from the fan. Accordingly, noise generation tends to easily increase when the fan rotates at a higher speed.

There are several methods considered as possible solutions to reduction of the noise generated from the fan disposed on the other bearing, non-driving, side, including a structure which decreases the opening area of the air outlet port, and a structure which positions the air outlet port away from the impellers so as to reduce the diffusion angle of the noise, for example. According to these methods, however, the amount of air flow is restricted and thus decreases, in which condition sufficient cooling effects are difficult to be provided.

Particularly, in the case of the structure which located the air outlet port away from the impellers, a guide is formed as a portion projecting in such a manner as to extend from the casing to the outside in the axial direction of the motor, for example. In this case, if the channel length of the cooling air becomes sufficiently long, and the air outlet port can be disposed away from the impellers. According to this structure, however, it is difficult to maintain the size of the envelope of the motor and housings to the size of the motor and housings established beforehand, i.e., the constrained space into which the motor and housing may be fitted in the trucks of the train.

In general, the motor attached to the truck has a severe size design limit determined beforehand, i.e., dictated by the available space in the truck, regardless of the type of motor.

More specifically, the motor is attached to the truck in such a condition that the axial direction of the rotor shaft is dictated by the lateral width direction of the vehicle. According to this structure, the motor is disposed in the space between the opposed wheels. In this case, at least a coupling and a gear box are also provided between the wheels and the motor. Accordingly, it is needed to position at least the motor, the coupling, and the gear box close to each other within the limited space between the wheels, imposing severe limitations on the size of the motor in the axial direction. In addition, the motor is attached between the cross beam of the truck and the axle in the front-rear direction of the vehicle. Thus, a severe limitation is also imposed on the size of the motor in the radial and width directions.

Accordingly, it is required to design the motor within the range of the severe limitations discussed above. Particularly, the size of the motor is an important factor which affects the output and performance of the motor, wherefore the motor needs to be designed based on sufficient experiences and various types of skills. In other words, it is essential to design the motor while utilizing technologies capable of securing the maximum output and performance, skills for improving the structure of the motor, and other techniques without exceeding the limited size.

However, when the guide extends from the casing as in the structure discussed above, the size increases by the amount of extension. In this case, it is difficult to size the motor within the predetermined size limitation or constraint and simultaneously extend the exhaust port away from the fan impellers to reduce noise.

DETAILED DESCRIPTION

Figure 1:
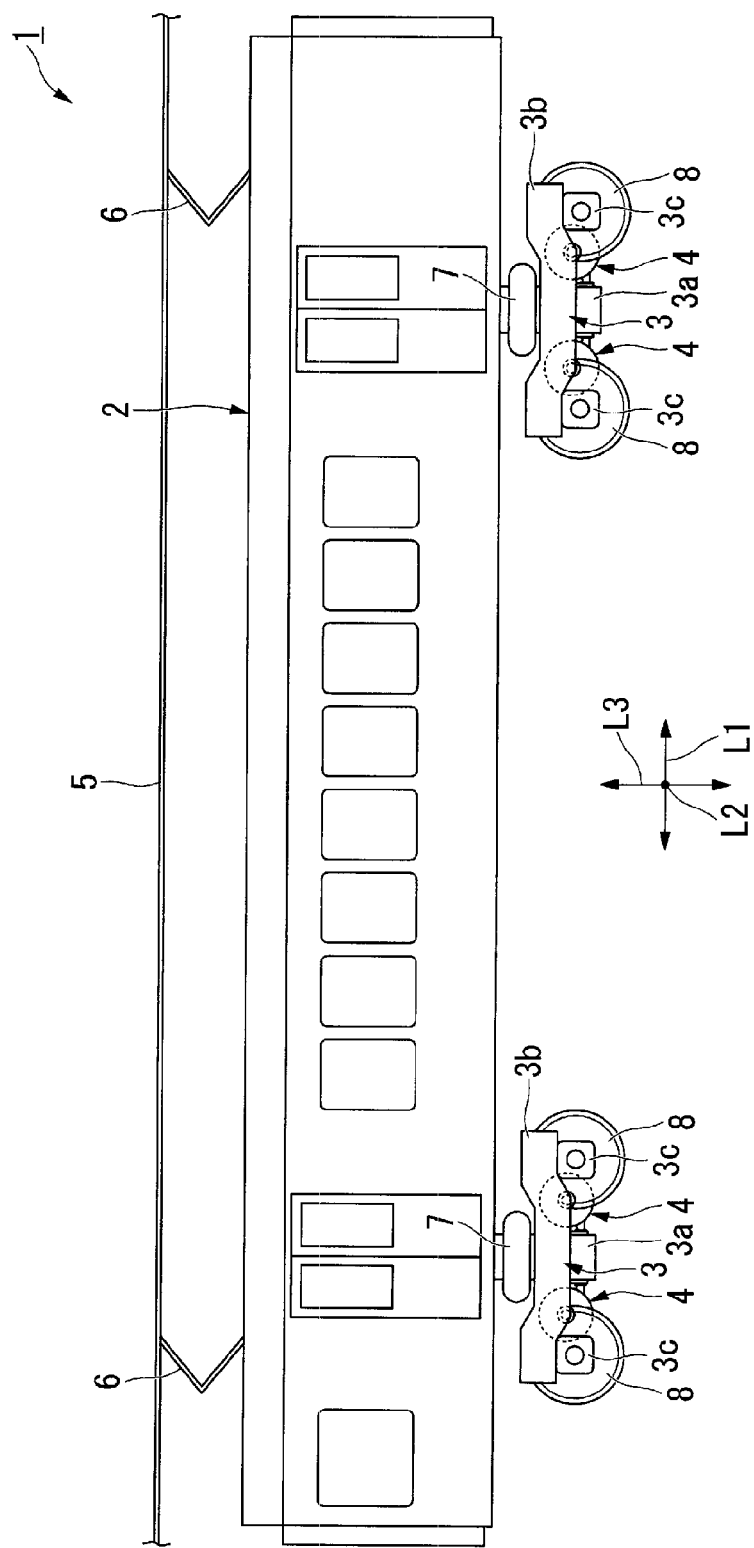
FIG. 1 illustrates a railway vehicle according to a first embodiment.

In general, according to one embodiment, it is an object to be achieved by the respective examples of the embodiment to provide a motor capable of reducing noise while limiting the size of the motor to the range of a size limitation determined beforehand without decreasing the output performance of the motor.

According to an embodiment, a railway motor has a driven side from which the drive shaft of the motor extends, and the motor housing on the side of a railway motor opposite to the driven side includes an inlet, and an outlet, wherein the outlet is configured to direct the exhaust, and the noise associated with the fan impellers, in a direction away from the carriage of the motor and to a location distant from the fan impeller. In one aspect, this is provided by forming the side housing of the motor to include an inner wall and a shroud, such that a discharge channel is formed between the shroud and inner wall of the case housing, and forming an exhaust port therewith having an inwardly tapered exhaust opening. In this aspect, the channel may have an arcuate shape, and an inlet channel may be formed thereadjacent, also of an arcuate shape. The cross section of the inlet and exhaust ports may be provided to be approximately equal, despite the tapering of the channel from the inlet to the outlet side. In another aspect, the outer wall, or shroud, of the casing, and the discharge channel opening, does not extend outwardly further than other components of the case along the same side of the case. Additionally, the line of sight between the fan and the opening of the channel to the exterior extends away from the train carriage to direct fan noise away from the train carriage.

According to another embodiment, a motor for a vehicle includes: a rotor shaft rotating around an axis; a rotor iron core fixed to the rotor shaft; a stator iron core disposed outside the rotor iron core in a radial direction; a casing accommodating the rotor iron core and the stator iron core inside thereof, and supporting each of both axial ends of the rotor shaft via a bearing such that the rotor shaft is rotatable; an air inlet port formed in a portion of the casing outside the bearing in the radial direction; and a fan provided between the rotor iron core and the bearing and rotating with the rotor shaft to introduce outside air through the air inlet port, wherein a portion of the casing positioned outside impellers of the fan in the axial direction forms a first housing and a second housing constituting a discharge channel through which the outside air is discharged, the first housing includes a guide wall extending toward the outside in the radial direction, and the second housing includes a thin wall portion having a thinner wall thickness than that of the other area of the second housing and is located inside the guide wall in the axial direction to constitute the discharge channel between the thin wall portion and the guide wall.

A railway vehicle according to an embodiment includes: the motor; and a vehicle body to which the motor is attached in such a condition that the motor is be carried below the floor of the vehicle body via a truck.

Exemplary embodiments are hereinafter described with reference to the drawings.

First Embodiment

Structure of Railway Vehicle

As illustrated in FIG. 1, a railway vehicle 1 according to this embodiment includes a vehicle body 2, and motors (motors for a vehicle) 4 provided below the floor of the vehicle body 2 via trucks 3.

A power converter (not shown) for a vehicle is attached below the floor of the vehicle body 2, for example. The power converter for a vehicle converts direct current power supplied from wiring 5 via pantographs 6 or direct current power supplied from a power supply source (not-shown) into alternating current power, and supplies the alternating current power to the motors 4 and various types of not-shown electric equipment (such as air conditioners) provided on the vehicle body 2.

According to this embodiment, a direction connecting the front and rear of the vehicle body 2 is referred to as a "front-rear direction L1", a width direction of the vehicle body 2 is referred to as a "left-right direction L2", and a height direction of the vehicle body 2 is referred to as an "up-down direction L3".

The trucks 3 are attached below the floor of the vehicle body 2 with shock absorbing devices 7 such as air springs interposed between the floor and the trucks 3. Left and right wheels 8 are supported on each of the trucks 3 to ride on rails. The motors 4 are attached in such positions as to be located in the vicinity of each of the wheels 8.

Figure 2:
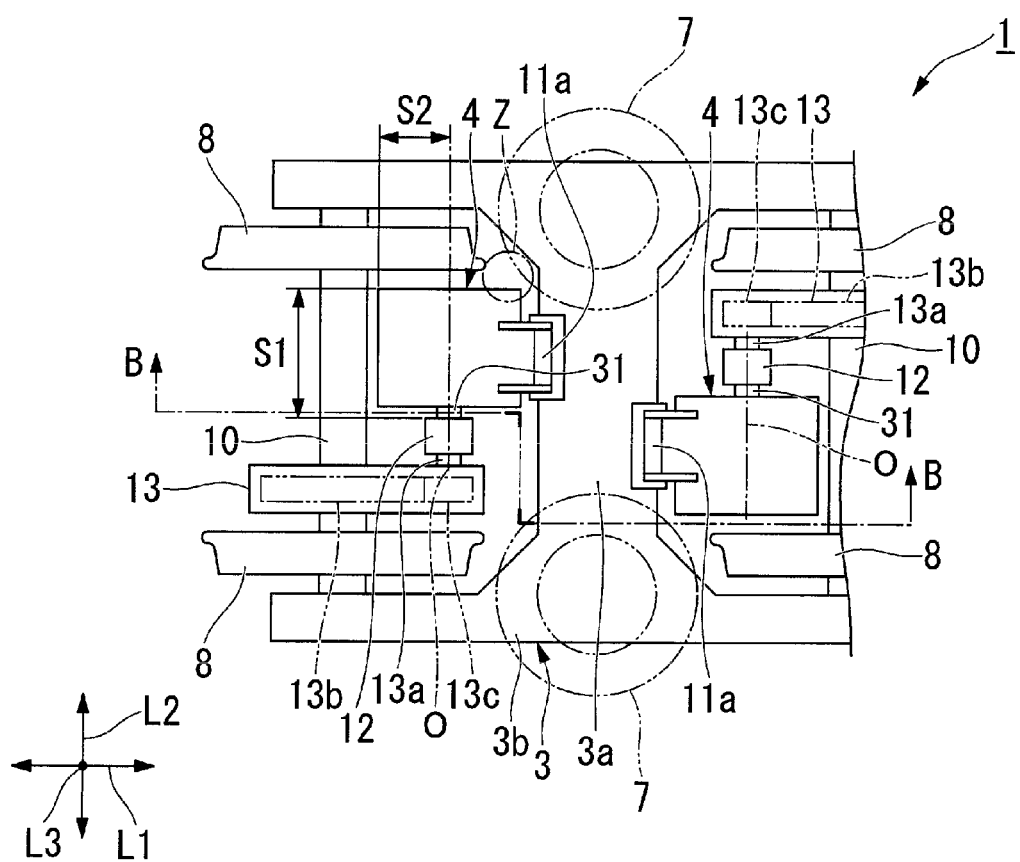
FIG. 2 is a top view of a truck provided below the floor of a vehicle body shown in FIG. 1.
Figure 3:
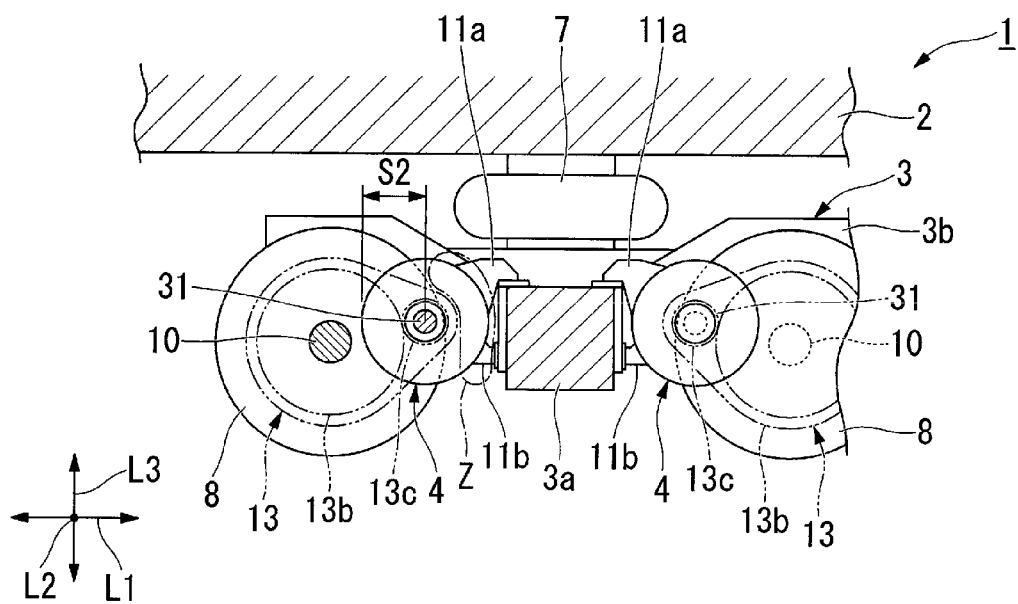
FIG. 3 is a cross-sectional view taken along a line B-B in FIG. 2.

This structure is now specifically explained. As illustrated in FIGS. 2 and 3, the truck 3 has a truck beam 3b which has a substantially H shaped in plan view and contains a beam portion 3a extending in the left-right direction L2 of FIG. 2. The shock absorbing devices 7 discussed above are provided above the beam portion 3a with a clearance left between each of the shock absorbing devices 7 in the left-right direction L2. The truck beam 3b is attached below the floor of the vehicle body 2 with the two shock absorbing devices 7 interposed between the truck beam 3b and the floor.

The shape of the truck beam 3b, the number of the shock absorbing devices 7, the installation position and other conditions are not limited to the corresponding conditions in this embodiment.

Two axles 10, each connecting left and right wheels 8, are provided on the truck beam 3b with the beam portion 3a interposed between the two axles 10 in the front-rear direction L1. The axles 10 are attached via shaft bearing boxes 3c (see FIG. 1) provided within the truck beam 3b. The motors 4 are fixed to the beam portion 3a in such a condition as to be located between the beam portion 3a and each of the two axles 10. More specifically, upper attachment arms 11a and lower attachment arms 11b attached to casings 40 (described later with respect to FIG. 4) of the motors 4 as one body are fixed to attachment seats formed on the beam portion 3a side via not-shown fastening members such as bolts. According to this structure, each of the two motors 4 is fixed so as to be positioned between an axle 10 and the beam portion 3a and between the left and right wheels 8 of the axle 10.

In this case, each of the motors 4 is fixed such that a rotor shaft 31 (described later) extends in parallel with the axle 10 (i.e., is disposed in the left-right direction L2). The rotor shaft 31 of each of the motors 4 is connected with a driving shaft 13a projecting from a gear box (gear unit) 13 via a coupling (joint) 12. There are positioned within the gear box 13 at least a gear 13b (shown in phantom in FIG. 2) mechanically connected with the axle 10, and a pinion 13c (shown in phantom in FIG. 2) engaging with the gear 13b and mechanically connected with the driving shaft 13a.

According to this structure, the motors 4 rotate by supplied alternating current power, and transmit rotational forces generated thereby to the axles 10 and the wheels 8 via the gear boxes 13 to allow running (movement of the railway vehicle 1.

While the figure shows the example in which the two motors 4 are offset from each other in the left-right direction L2 and fixed in such conditions that the respective rotor shafts 31 project in opposite directions, the embodiment is not limited to this example.

(Structure of Motor)

The details of the motors are now explained.

Figure 4:
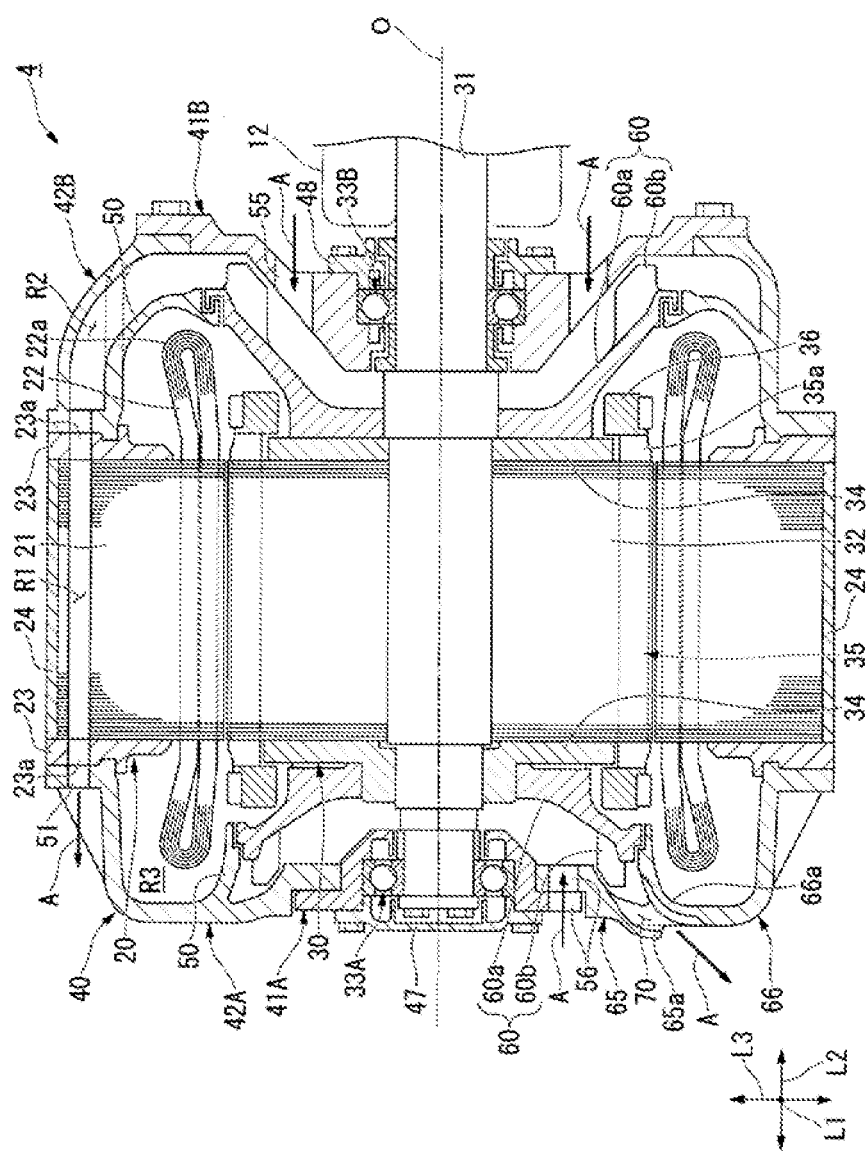
FIG. 4 is a vertical cross-sectional view of a motor shown in FIG. 2.

As illustrated in FIG. 4, each of the motors 4 is a main motor for vehicle driving, constituted by a fully enclosed type motor which includes a stator 20, a rotor 30 having the rotor shaft 31 rotating around an axis O, and a casing 40 covering the circumferences of the stator 20 and the rotor 30, and accommodating at least stator coils 22 of the stator 20 and rotor bars 35 of the rotor 30 within the casing 40.

According to this embodiment, the direction perpendicular to the axis O is referred to as a radial direction, while the direction along the circumference around the axis O is referred to as a circumferential direction. The rotor shaft 31 is disposed in parallel with the axle 10 (FIG. 2), wherefore the axial direction of the rotor shaft 31 extends in the left-right direction L2. Among the axial directions, the side where the rotor shaft 31 connects with the coupling 12 is referred to as the driving side, while the side opposite to this side is referred to as the side opposite to the driving side.

(Stator)

The stator 20 includes a stator iron core 21 and the stator coils 22.

The stator iron coil 21 has a ring shape formed by laminating a plurality of iron core layers on the outside of a rotor iron core 32 of the rotor 30 in the radial direction. In this case, both sides of the stator iron core 21 in the left-right direction L2 are sandwiched between a pair of annular iron core supporting members 23. The stator iron core 21 is supported by the casing 40 via the pair of the iron core supporting members 23.

A connecting plate 24 for connecting the pair of the iron core supporting members 23 is attached to the outer circumferential surface of the stator iron core 21 in such a manner as to cover the stator iron core 21 from the outside in the radial direction. The connecting plate 24 may be formed as a single annularly shaped member for covering the entire circumference of the stator iron core 21, or may be provided as discrete parts spaced from each other in the circumferential direction to cover a part of the stator iron core 21.

Plural grooves (not-shown), extending in the left-right direction L2, are formed on the inner circumferential side of the stator iron core 21 while spaced from each other in the circumferential direction. The stator coils 22 are embedded in these plural grooves. In this case, a coil end 22a of each of the stator coils 22 projects in such a manner as to extend from the stator iron core 21 to either side thereof in the left-right direction L2.

An air channel R1, which extends through the stator iron core in the left-right direction L2, is formed on the outer circumferential side of the stator iron core 21. Communication bores 23a communicating with the air channel R1 are formed in the respective iron core supporting members 23 in such a manner as to extend through the iron core supporting members 23.

(Rotor)

The rotor 30 is an inner rotor disposed inside, i.e., radially within the envelope of, the stator 20, and is configured to rotate around the axis O. The rotor 30 includes a rotor shaft 31 extending in the left-right direction L2, and a rotor iron core 32 fixed to the rotor shaft 31.

The rotor shaft 31 is inserted into, the interior of the casing 40 from the driving side and extends across, and is supported by, bearings 33A, 33B both housings 41A, 41B of the casing 40. One end of the rotor shaft 31 positioned on the side opposite to the driving side is supported by a bearing 33A, while the other end positioned on the driving side is supported by a bearing 33B. As explained above, the other end of the rotor shaft 31 (extending to the right of FIG. 4) is connected with the driving shaft 13a of the gear box 13 via the coupling 12.

While the figure shows the example which contains the rotor shaft 31 comprising a multistage shaft whose radius varies along the axial direction, the embodiment is not limited to this example.

The rotor iron core 32 is ring-shaped and fixed to the rotor shaft 31 in such a position as to be located within the stator iron core 21 in the radial direction. In this case, a predetermined annular air gap (clearance) is secured throughout the circumference between the outer circumferential surface of the rotor iron core 32 and the inner circumferential surface of the stator iron core 21. The rotor iron core 32 is fixed to the rotor shaft 31 in such a condition as to be sandwiched between a pair of annular rotor iron core supporting members 34 from both sides in the left-right direction L2.

A plurality of grooves, (not shown) extending in the left-right direction L2 are formed on the outer circumferential side of the rotor iron core 32 while spaced from each other in the circumferential direction. One or more rotor bars 35 are embedded in each of the plural grooves. In this case, bar ends 35a of each of the rotor bars 35 extend from the rotor iron core 32 to the sides thereof in the left-right direction L2. The bar ends 35a of the respective rotor bars 35 are combined into one body (i.e., electrically intercon-nected) by an annular short-circuit ring 36. According to this structure, the rotor 30 functions as a cage rotor constituting an inductive motor.

(Casing)

The casing 40 discussed above includes a pair of annular bearing housings 41A and 41B disposed around the pair of the bearings 33A and 33B in the radial direction, and a pair of connecting housings 42A and 42B cylindrically shaped to surround the rotor shaft 31 from the outside in the radial direction and connecting between the bearing housings 41A and 41B and the iron core supporting members 23. The casing 40 has a substantially cylindrical shape whose left and right ends are closed by the bearing housings 41A and 41B and the connecting housings 42A and 42B, and it supports the rotor shaft 31 via the bearings 33A and 33B such that the rotor shaft 31 can freely rotate.

Connections between the bearing housings 41A and 41B and the connecting housings 42A and 42B, and between the connecting housings 42A and 42B and the iron core supporting members 23 are made by fastening members such as bolts. However, these connections are not limited to the type shown in this example but may be made by engagement fixation, welding or other methods.

The bearing housings 41A and 41B provided as components different from the connecting housings 42A and 42B in this example may be formed integrally with the connecting housings 42A and 42B.

Each of the spaces between the bearing housing 41A positioned on the side opposite to the driving side and the rotor shaft 31, and between the bearing housing 41B positioned on the driving side and the rotor shaft 31 has a labyrinth structure to secure sealing for these spaces.

Covers 47 and 48 are attached to the portions of the pair of the bearing housings 41A and 41B, respectively, located outside the bearings 33A and 33B in the left-right direction L2.

The cover 47 positioned on the side opposite to the driving side is disc-shaped and fixed to the bearing housing 41A by a fastening member such as a bolt in such a manner as to cover the bearing 33A from the outside in the left-right direction L2. According to this structure, one end of the rotor shaft 31 is closed within the interior of the casing 40.

On the other hand, the cover 48 positioned on the driving side is annularly shaped and fixed to the bearing housing 41B by a fastening member such as a bolt in such a manner as to surround the rotor shaft 31 from the outside in the radial direction.

According to the example shown in FIG. 4, the pair of bearings 33A and 33B are rolling bearings each of which has an inner ring fixed to the rotor shaft 31 and an outer ring fixed to the bearing housings 41A or 41B with rolling elements such as balls provided between both the rings.

The bearings 33A and 33B are not limited to rolling bearings but may be any types of bearings as long as the bearings can support the rotor shaft 31. In addition, radial bearings, thrust bearings or other bearings may be appropriately selected in accordance with the direction of the load to be applied.

Each of the connecting housings 42A and 42B has a part forming a partitioning wall 50 which extends toward the inside in the left-right direction L2 and function to partially enclose (in conjunction with fans 60), components such as the stator coils 22 and the rotor bars 35 therein, and form air ducts exterior to the enclosed stator coils 22 and the rotor bars 35 to enable cooling thereof in cooperation with fans 60 (as described later herein).

The connecting housing 42B positioned on the driving side has an air channel R2 communicating with the foregoing air channel R1 formed in the stator iron core 21. The air channel R2 is located inside the connecting housing 42B (rotor shaft 31 side) and outside the partitioning wall 50. On the other hand, the connecting housing 42A positioned on the side opposite to the driving side has an air outlet port 51 located in the connecting portion between the connecting housing 42A and the iron core supporting member 23. The air outlet port 51 communicates with the communicating bore 23a formed in the iron core supporting member 23, and opens to the outside of the casing.

Therefore, the air channel R2 formed in the connecting housing 42B and the air outlet port 51 communicate with each other via the air channel R1 formed in the stator iron core 21 and the communicating bore 23a formed in the iron core supporting member 23.

Moreover, the upper attachment arm 11a and the lower attachment arm 11b discussed above (see FIGS. 2 and 3) are attached to the stator 20 in such a manner as to project from the upper side and the lower side of the stator 20 or the exterior annular member 24 covering the stator, respectively, and extend outwardly of the casing 40 to be secured to the beam portion 3a of the truck 3.

(Air Inlet Ports of Casing)

Air inlet ports 55 and 56 are formed in the casing 40 in the area located radially outside of the location of the bearings 33A and 33B in the housings 41A, 41B.

The air inlet ports 55 positioned on the driving side are formed in such a manner as to extend through bearing housing 41B, such that the exterior wall of the housing 41B provides a shroud forming the outer wall of an air flow passage R2. In this case, the air inlet ports 55 are of a circular shape as viewed from the side, for example, and are intermittently disposed, and spaced from each other, in the circumferential direction along the side of the casing 40. The air inlet ports 55 are not limited to the type shown in the figure. The shape, the number or other conditions of the air inlet ports 55 may be varied in appropriate manners.

Figure 5:
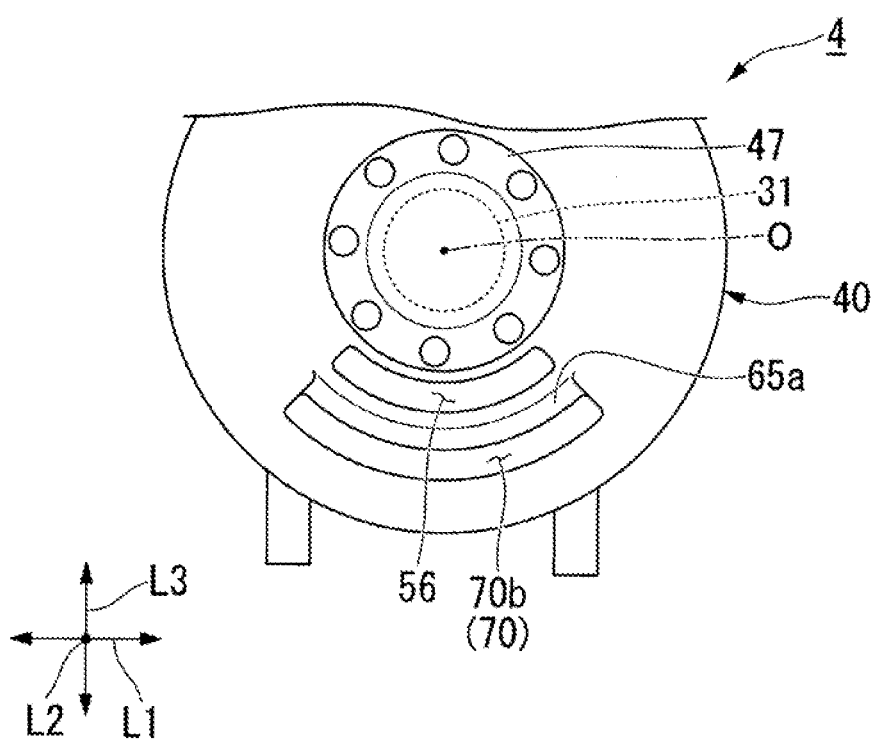
FIG. 5 is a partial side view of the motor shown in FIG. 4 as viewed from the side opposite to the driving side.

On the other hand, the air inlet port 56 positioned on the side opposite to the driving side is located in the area below the bearing 33A, and so configured so as to extend through the bearing housing 41A and the connecting housing 42A, and extend in a circular-arc shape in the circumferential direction as illustrated in FIGS. 4 and 5.

(Fans)

As illustrated in FIG. 4, the two fans 60 are located within the casing 40 constructed as above, one and the other of which are positioned between the rotor iron core 32 and the bearing 33A and between the rotor iron core 32 and the bearing 33B, respectively. The fans 60 rotate with the rotor shaft 31 to introduce outside air A through the air inlet ports 55 and 56.

Each of the fans 60 includes a cylindrical main plate 60a expanding outward in the left-right direction L2 from the inner circumferential edge to the outer circumferential edge of the main plate 60a, and impellers 60b provided on the outer surface (surface facing to the bearing housing 41A or 41B) of the main plate 60a, constituting the external general appearance in the shape of a substantially circular truncated cone.

The impellers 60b of each of the fans 60 are positioned outside the air inlet ports 55 and 56 in the radial direction, and radially disposed around the axis O.

The fan 60 located on the driving side is attached to the rotor shaft 31 by engagement between the inner circumferential edge of the fan 60 and the rotor shaft 31, and is also maintained in a condition of contact (tight contact) between the fan 60 and the rotor iron supporting member 34. On the other hand, the fan 60 positioned on the side opposite to the driving side is attached to the rotor iron supporting member 34 by engagement between the inner circumferential edge of the fan 60 and the rotor iron core supporting member 34 in a condition of contact between the fan 60 and the rotor iron supporting member 34. According to this structure, each of the fans 60 rotate along with the rotor shaft 31 in the spaces between the rotor iron core 32 and the bearings 33A or 33B.

The positions of the fans 60 are not limited to the positions shown in this example.

The outer circumferential edge (furthest radial extent) of the main plate 60a of each of the fans 60 is disposed to be opposed to the inner circumferential end of the partitioning wall 50 of the connecting housings 42A or 42B with a clearance between the edge of the main plate 60a and the end of the partitioning wall 50. The outer circumferential edge of the main plate 60a and the inner circumferential end of the partitioning wall 50 constitute labyrinth seal for sealing the clearance between the two components in cooperation with each other.

According to this structure, the stator coils 22 and the rotor bars 35 are accommodated within inner spaces R3 surrounded by the partitioning walls 50 and the main plates 60a of the fans 60 in such a condition as to be separated from the outside air A introduced by the fans 60. In other words, a fully enclosed, air cooled structure is formed.

Accordingly, outside air A introduced by the fans 60 can be utilized for cooling the motor 4 without the outside air A entering into the inner spaces R3 where the rotor and stator components are maintained.

The outside air A introduced by the fan 60 located on the driving side flows within the air channel R2 formed in the connecting housing 42B, and exits out through the air outlet port 51 for discharge. During this process, cooling can be achieved. The details of this mechanism will be explained later.

(Outside Air Discharge Structure on Side Opposite to Driving Side)

Discharge of the outside air A introduced by the fan 60 positioned on the side opposite to the driving side is now explained.

Figure 6:
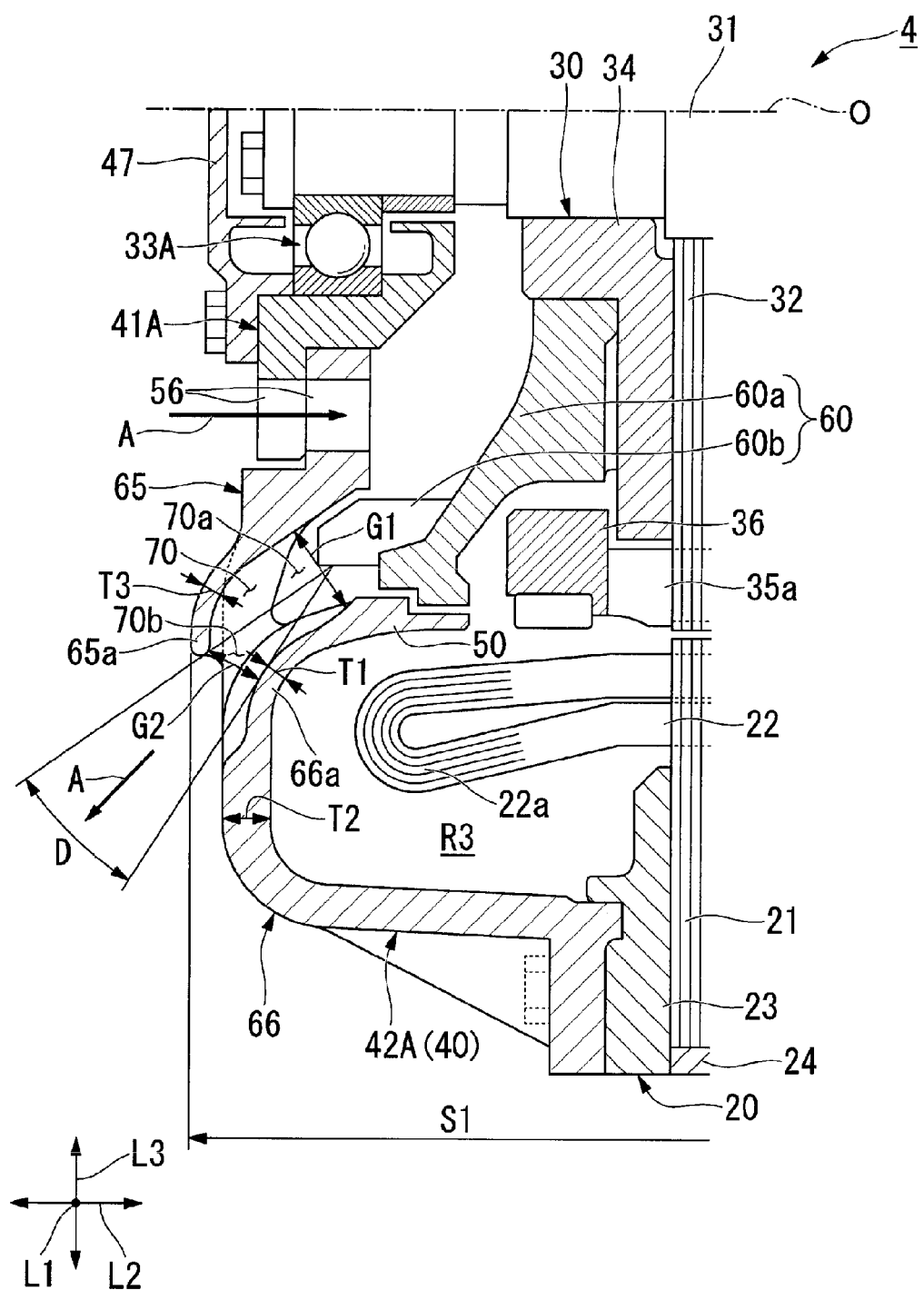
FIG. 6 is an enlarged cross-sectional view illustrating an enlarged area around a discharge channel of the motor shown in FIG. 4.

As illustrated in FIG. 6, a first portion 65 of housing 42A forms a shroud or guide wall 65a and a second portion 66 of housing 42A positioned on the side opposite to the driving side, which area corresponds to the lower part (track side) of the connecting housing 42A located outside the impellers 60b of the fan 60 in the left-right direction L2 (outside in the axial direction) together form a discharge channel 70 through which the outside air A is discharged is formed between the housing portions 65 and 66.

Figure 7:
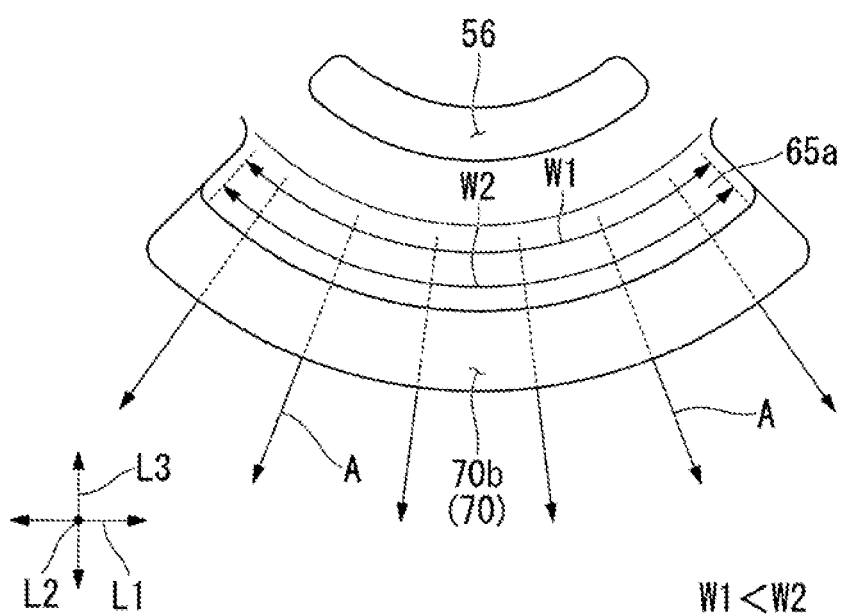
FIG. 7 is a side view of an air inlet port and the discharge channel shown in FIG. 6 as viewed from the side opposite to the driving side.

The first portion 65 which forms a shroud or guide wall 65a is connected with the bearing housing 41A, such that the guide wall 65a extends downwardly (toward the outside in the radial direction) as illustrated in FIGS. 6 and 7. The first portion 65 may alternatively be a separate element from the housing 42A, or an integral extension of bearing housing 41A.

The guide wall 65a is located in such a position that the root of the guide wall 65a lies substantially outside the impellers 60b of the fan 60 in the left-right direction L2. The guide wall 65a extends from this root and is curved downwardly and axially outwardly, whereby the tip portion of the guide wall 65a extends almost perpendicularly to the shaft 31 direction, in the up-down direction L3 (along the plane perpendicular to the axis O).

As illustrated in FIG. 6, the second portion 66 is connected to the iron core supporting member 23, and has a thin wall portion 66a disposed inside of the guide wall 65a of the first portion 65 in the left-right direction L2 (inside in the axial direction) and, in conjunction with the guide wall 65a, forms the discharge channel 70 in the space between the thin wall portion 66a and the guide wall 65a.

The thin wall portion 66a, in the area facing the guide wall 65a, has a thinner wall thickness than that of the remainder of the second portion 66 of the housing 42A, which thinner section corresponds to a recess on the outer surface side of the partitioning wall 50. The thin wall portion 66a extends from a position outside of, and spaced from, the impellers 60b of the fan 60 in the radial direction to a position located below the tip of the guide wall 65a.

According to the example shown in FIG. 6, the wall thickness T1 of the thin wall portion 66a is approximately one-half the wall thickness T2 of the other adjacent portions of the second portion 66. On the other hand, a thickness T3 of the guide wall 65a is substantially the same as the wall thickness T1 of the thin wall portion 66a. Thus, the sum of the thickness of the guide wall 65a and the thickness of the thin wall portion 66a is approximately the same as the thickness of the other area of the second portion 66. The thicknesses of the thin wall portion 66a and the guide wall 65a are not limited to the thicknesses established in this example, but may be varied in appropriate manners.

As will be described further herein, the cross section of the discharge channel 70 is preferably maintained constant along its length. Additionally, the guide wall 65a is disposed closer to the second portion 66 by the amount of the recess into the thin wall portion 66a. Accordingly, the projection of the guide wall 65a outwardly of the side of the case 40 beyond the extension of other elements, such as bearing cover 47 in the left-right direction L2 is effectively suppressed as compared to prior art cases. Thus, the position of the tip of the guide wall 65a and the cover 47 covering the bearing 33A positioned on the side opposite to the driving side from the outside in the left-right direction L2 are located substantially in the same plane.

The guide wall 65a and the thin wall portion 66a are both configured to extend in circular-arc shapes in the circumferential direction similarly to the air inlet port 56. Accordingly, the discharge channel 70 formed between the guide wall 65a and the thin wall portion 66a is also formed in a circular-arc shape in the circumferential direction as illustrated in FIGS. 5 and 7.

As illustrated in FIG. 6, the guide wall 65a and the thin wall portion 66a are so disposed as to approach each other in the direction from an entrance port 70a to an exit port 70b of the discharge channel 70, such that the discharge channel 70 narrows toward the exit port 70b. Accordingly, the space between the guide wall 65a and the thin wall portion 66a at the exit port 70b is narrower than at the entrance port 70a in the discharge channel 70. In other words, comparing a shortest distance G1 between the guide wall 65a and the thin wall portion 66a at the entrance port 70a with a shortest distance G2 between the guide wall 65a and the thin wall portion 66a at the exit port 70b, the smallest distance G2 at the exit port 70b is made smaller than the smallest distance G1 at the entrance port 70a.

The smallest distance in this context refers to the smallest distance between the guide wall 65a and the thin wall portion 66a in the plane perpendicular to the flow line of the outside air A flowing within the discharge channel 70.

According to the structure including the discharge channel 70 constructed above, the outside air A introduced by the fan 60 positioned on the side opposite to the driving side flows from the entrance port 70a through the inside of the discharge channel 70, and goes out through the exit port 70b to be discharged. Cooling can be achieved during this process. The details of this mechanism will be described later.

[Operation and Advantage]

The operation of the motor 4 having the structure described above is now explained.

During operation of the railway vehicle 1, alternating current power from the power converter for the vehicle is supplied to the stator coils 22. As a result, a rotating magnetic field is produced in the stator coils 22, and a current is thereby induced in the rotor bars 35 of the rotor 30 disposed within the rotating magnetic field. By the interaction between the current and the rotating magnetic field, torque is generated and causes rotation of the rotor 30 around the axis O. This rotational force is transmitted to the gear box 13 via the coupling 12, and further transmitted from the gear box 13 to the axles 10 and the wheels 8. Accordingly, the wheels 8 are driven to allow running of the railway vehicle 1.

When the rotor shaft 31 of the rotor 30 rotates, the pair of fans 60 rotate in accordance with the rotation of the rotor shaft 31. As a result, outside air A can be introduced through the air inlet ports 55 and 56 as illustrated in FIG. 4.

The outside air A introduced by the fan 60 positioned on the driving side flows along the radial direction of the case, within the air passage, caused by the rotational force of the impellers 60b of the fan 60, and the air thus flows into the air channel R2 formed in the connecting housing 42B. Then, the outside air A continues to flow through the air channel R1 formed in the stator iron core 21, and goes out through the air outlet port 51 for discharge.

The outside air A during the period from introduction to discharge can be used for cooling the bearing 33B, the rotor 30, and the stator 20.

More specifically, the fan 60 itself at first, and then the bearing 33B can be cooled by using the introduced outside air A. Heat of the rotor 30 chiefly generated from the rotor bars 35 is transmitted to the body of the fan 60 through the rotor iron core supporting member 34, wherefore the entire rotor 30 can be cooled by cooling the fan 60 with the air flow therepast. Accordingly, the rotor 30 and the bearing 33B can be initially cooled.

Then, the stator iron core 21 can be cooled by the outside air A flowing through the air channel R1 within the stator iron core 21. Heat generated from the stator coils 22 is transmitted to the stator iron core 21. Thus, the entire stator 20 can be cooled by cooling the stator iron core 21.

Accordingly, the bearing 33B, the rotor 30, and the stator 20 can be cooled by using the outside air A introduced by the fan 60 positioned on the driving side.

On the other hand, the outside air A introduced by the fan 60 positioned on the side opposite to the driving side is caused to flow in the radial direction by the rotational force of the impellers 60b of the fan 60 as illustrated in FIGS. 6 and 7, and thence flows into the entrance port 70a of the discharge channel 70 formed between the guide wall 65a of the first housing 65 and the thin wall portion 66a of the second housing 66. Then, the outside air A flows through the discharge channel 70, and radially exits as viewed in the side view through the exit port 70b.

During the period from introduction to discharge, the outside air A can be used for cooling the bearing 33A and the rotor 30, similarly to that of the cooling for the driving side.

As apparent from above, the pair of bearings 33A and 33B, the rotor 30, and the stator 20 can be cooled by using the outside air A introduced and circulated by the pair of the fans 60. In this case, the output and performance of the motor 4 meeting the design values can be achieved without increasing the temperature of the motor 4 even when the motor 4 has the fully enclosed structure. Moreover, temperature increases in the bearings 33A and 33B, and the need for lubricating oil for lubricating these bearings 33A and 33B, can be avoided. In this case, the lives of the bearings 33A and 33B can be extended, and the rotor shaft 31 can be rotationally supported in a stable condition. Accordingly, the output of the motor can be easily maintained over a longer lifetime.

As illustrated in FIG. 6, the first housing 65 forming the discharge channel 70 includes the downwardly extending shroud or guide wall 65a. Thus, the outside air A can be discharged, in a downward direction, guided by the shroud guide wall 65a. Moreover, the discharge channel 70 can be elongated by the length of the guide wall 65a extending over the thin wall portion 66a, wherefore the position of the exit port 70b of the discharge channel 70 can be shifted away from the impellers 60b.

Accordingly, the conduit formed of the discharge channel 70 causes the diffusion angle (discharge angle) D associated with discharge of the outside air A to be smaller; wherefore the wind noise of the impellers 60b generated by the air discharged to the outside can be decreased. This effect contributes to noise reduction.

Additionally, because the thin wall portion 66a of the second housing 66 is disposed inside the guide wall 65a of the first housing 65 in the left-right direction L2 and opposed to the guide wall 65a so as to form the discharge channel 70 in the space between the thin wall portion 66a and the guide wall 65a, the guide wall 65a can be shifted inward in the left-right direction L2 by the amount of reduction of the wall thickness of the thin wall portion 66a while securing a sufficient cross-sectional area of the exit port 70b (surface perpendicular to the flow line of the outside air A) to maintain a constant cross section of the discharge channel 70.

Therefore, projection of the guide wall 65a to the outside, in the left-right direction L2, from the other adjacent portions of the casing 40 can be avoided, while maintaining preferable cooling efficiency and achieving noise reduction. Accordingly, an increase in the general size of the motor 4 otherwise required to ensure an adequate size of the discharge channel 70 can be avoided.

More specifically, the motor 4 is disposed between the left and right wheels 8 together with the gear box 13 and the coupling 12 as illustrated in FIG. 2. In this case, the axial size or space S1 available for fitting of the motor 4 is severely limited, and is dictated by the size of the truck, axle and wheel components. Moreover, the motor 4 is disposed between the axles 10 and the beam portion 3a of the truck 3 as illustrated in FIGS. 2 and 3. In this case, the radial size or space S2 into which the motor 4 can be fit also has severe limitations, similar to the limits on the axial size S1.

According to this embodiment, projection of the guide wall 65a from the casing 40 sidewalls is reduced or eliminated. Accordingly, the size of the motor 4 can be limited to the range of the axial size S1 corresponding to the size as illustrated in FIG. 6.

In addition, the guide wall 65a and the thin wall portion 66a constituting the discharge channel 70 approach each other in the direction from the entrance port 70a to the exit port 70b. In this case, the exit port 70b can be made narrower than the entrance port 70a. Accordingly, the diffusion angle D can be effectively decreased, wherefore reduction of the noise caused by the exiting air flow can be easily achieved.

The guide wall 65a extends in a circular-arc shape in the circumferential direction. According to this structure, the tip of the guide wall 65a positioned on the exit port 70b side obviously extends a longer radial distance from the axis O than that of the root of the guide wall 65a positioned on the entrance port 70a side. In this case, a length W2 of the tip of the guide wall 65a in the circumferential direction is naturally longer than a length W1 of the root of the guide wall 65a in the circumferential direction as illustrated in FIG. 7. Accordingly, the area of the opening at the entrance port 70a and the area of the opening at the exit port 70b can be made substantially equal to each other even when the length at the exit port 70b in the left-right direction L2 is decreased by the amount of the difference between the lengths W1 and W2, because the gap between the guide wall 65a and the thin wall portion 66a is larger at the entrance port 70a than at the exit port 70b.

Figure 8:
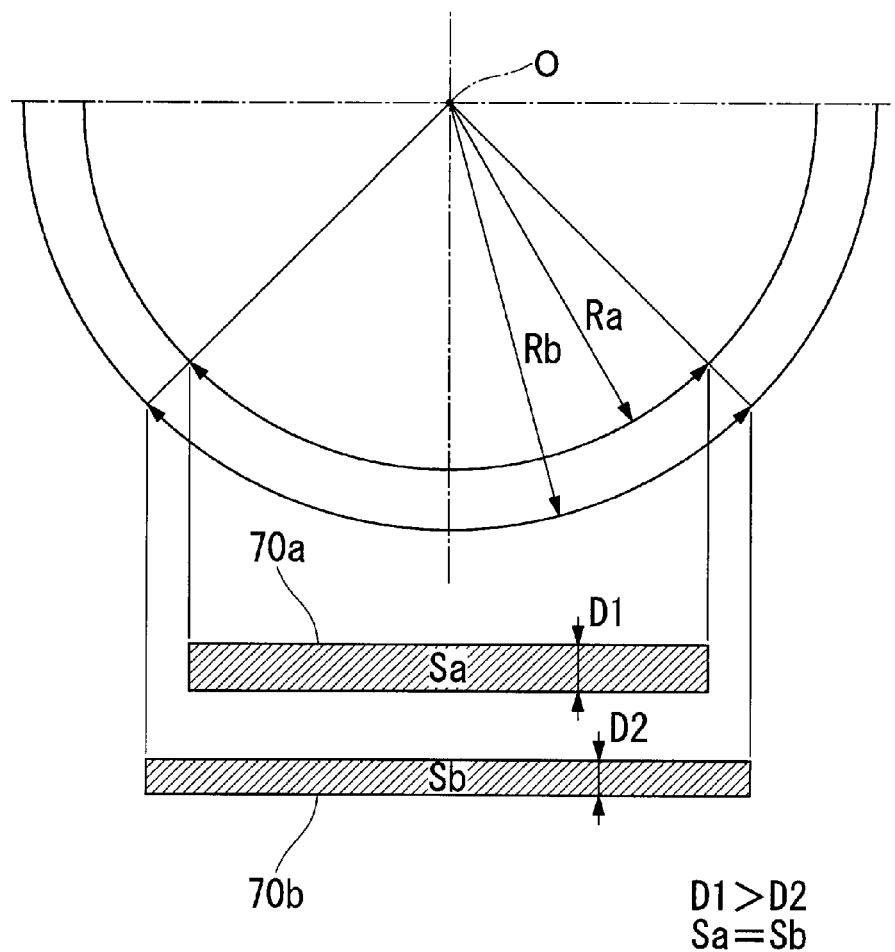
FIG. 8 schematically illustrates the relationship between the cross-sectional area of an entrance port of the discharge channel shown in FIG. 6 and the cross-sectional area of an exit port of the discharge channel.

This point is herein explained with reference to a schematic illustration in FIG. 8. When the entrance port 70a and the exit port 70b of the discharge channel 70 are positioned at a radius Ra and a radius Rb from the axis O, respectively, the length of the exit port 70b in the circumferential direction becomes longer than the length of the entrance port 70a in the circumferential direction. Thus, when a length D2 of the exit port 70b in the axial direction is made shorter than a length D1 of the entrance port 70a in the axial direction by the difference between the lengths of the entrance port 70a and the exit port 70b in the circumferential direction, a cross-sectional area Sa of the entrance port 70a and a cross-sectional area Sb of the exit port 70b can be equalized.

Accordingly, when the exit port 70b of the discharge channel 70 is narrowed in the left-right direction L2 as illustrated in FIG. 6, only the diffusion angle D of the wind noise can be decreased without lowering the discharge amount of the outside air A (without lowering cooling efficiency) which would occur if the cross section of the exhaust narrowed in the exhaust direction.

According to this embodiment explained above, the output and performance can be stabilized with noise reduction and sufficient cooling while limiting the size of the motor 4 to the range of the axial size S1 corresponding to the limited space available for installation in a train. Accordingly, the motor 4 become an ideal motor capable of providing the maximum output and performance while meeting the limited size, for example, contributing to improvement over the running performance of the railway vehicle 1.

Modified Example of First Embodiment

The first embodiment discussed above is the example which disposes the air inlet port 56 and the discharge channel 70 located on the side opposite to the driving side in the area of the case 40 below the bearing 33A. However, the embodiment is not limited to this example. For example, the air inlet port 56 and the discharge channel 70 may be located above the bearing 33A (vehicle body 2 side), or on the right side or left side of the bearing 33A. The installation positions of these components 56 and 70 are not therefore limited to any particular positions but may be varied in appropriate manners. However, it is more preferable to locate the positions of the air inlet port 56 and the discharge channel 70 in the lower part of the casing 40 (track side) in view of the advantage of prevention of easy entrance of dust, moisture, etc. into the case 40.

The number of the air inlet ports 56 and discharge channels 70 is not limited to one. For example, a plurality of air inlet ports 56 and discharge channels 70 may be provided while spaced from each other in the circumferential direction, in such positions as to be intermittently arranged along the circumference of the side of the case opposite to the driving side.

According to the first embodiment, the air inlet port 56 positioned on the side opposite to the driving side is formed as an opening continuously extending though the bearing housing 41A and the connecting housing 42A. However, the air inlet port 56 is not limited to this example. For example, the air inlet port 56 may be formed as a port extending through only the connecting housing 42A. In this case, a relief portion (notch) not blocking the air inlet port 56 is formed in the bearing housing 41A, for example, so as not to close the entrance side of the air inlet port 56.

Second Embodiment

A second embodiment is hereinafter described.

This embodiment is different from the first embodiment in that the guide wall 65a of the first housing 65 is connected with the thin wall portion 66a of the second housing 66 via ribs.

The parts in the second embodiment similar to the corresponding constituent elements in the first embodiment are given similar reference numbers, and the same explanation of these parts is omitted.
[Structure of Motor]

Figure 9:
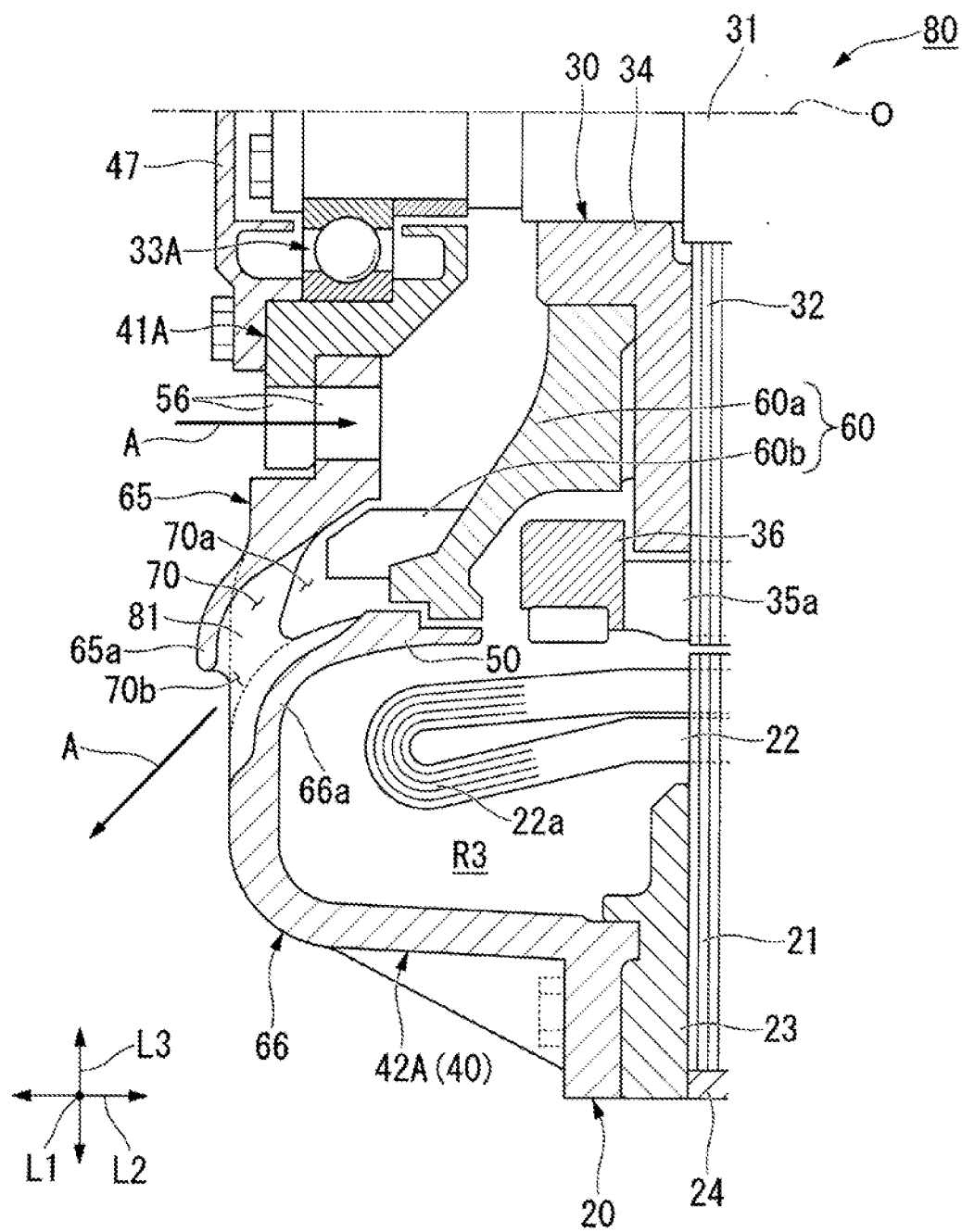
FIG. 9 is a partial cross-sectional view of a motor according to a second embodiment, illustrating an enlarged cross section around a discharge channel.
Figure 10:
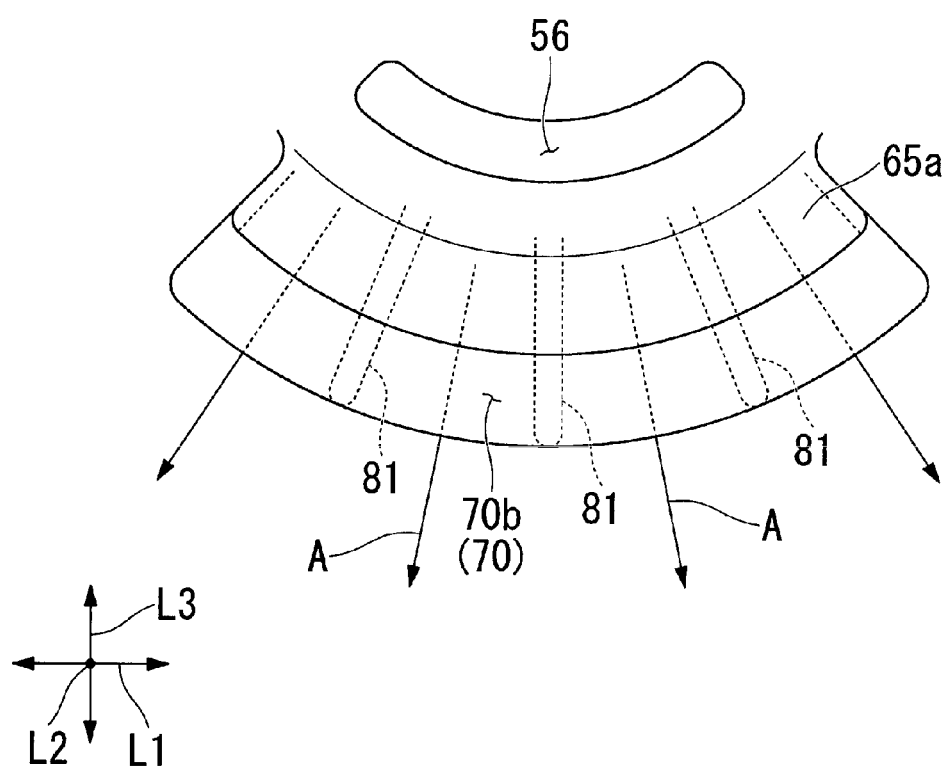
FIG. 10 is a side view of an air inlet port and the discharge channel shown in FIG. 9 as viewed from the side opposite to the driving side.

As illustrated in FIGS. 9 and 10, a motor 80 in this embodiment has a plurality of ribs 81 provided between the guide wall 65a of the first housing 65 and the thin wall portion 66a of the second housing 66 to connect the guide wall 65a and the thin wall portion 66a.

The plural ribs 81 are vertical ribs which extend in the radial direction and are spaced circumferentially in an arc around the axis O. According to the example shown in the figure, the three ribs 81 are disposed while spaced from each other in the circumferential direction. The number of the ribs 81 is not limited to this number but may be one, two, or four or larger.
[Operation and Advantage]

According to the motor 80 in this embodiment, operations and advantages similar to those of the first embodiment can be offered. In addition, the rigidity of the guide wall 65a and the thin wall portion 66 can be increased by the connection between the guide wall 65a and the thin wall portion 66a into one body via the plural ribs 81. Accordingly, irregular deformation of the guide wall 65a and the thin wall portion 66a, such as warping and deflection thereof, can be effectively prevented, for example. This advantage becomes more pronounced as the guide wall 65a and the thin wall portion 66a become longer in the circumferential direction.

Therefore, the shape of the discharge channel 70 can be maintained in a stable condition for a long period, wherefore noise reduction can be achieved in a stable condition. Moreover, the plural ribs 81 are radially disposed, in which arrangement the flow of the outside air A radially discharged after flowing within the discharge channel 70 is not easily blocked. Accordingly, decrease in the amount of the air is avoided, wherefore the cooling efficiency is not easily lowered.

Modified Example of Second Embodiment

According to the second embodiment described above, the plural ribs 81 are radially disposed. However, the arrangement of the ribs 81 is not limited to this example. The shapes and positions of the ribs 81 may be varied in appropriate manners as long as the ribs 81 do not block the flow of the outside air A through the discharge channel 70.

Third Embodiment

A third embodiment is hereinafter described.

This embodiment is different from the first embodiment in that the guide wall 65a of the first housing 65 and the thin wall portion 66a of the second housing 66 extend further downwardly as compared to the first embodiment hereof.

The parts in the third embodiment similar to the corresponding constituent elements in the first embodiment are given similar reference numbers, and the same explanation of these parts is omitted.
[Structure of Motor]

Figure 11:
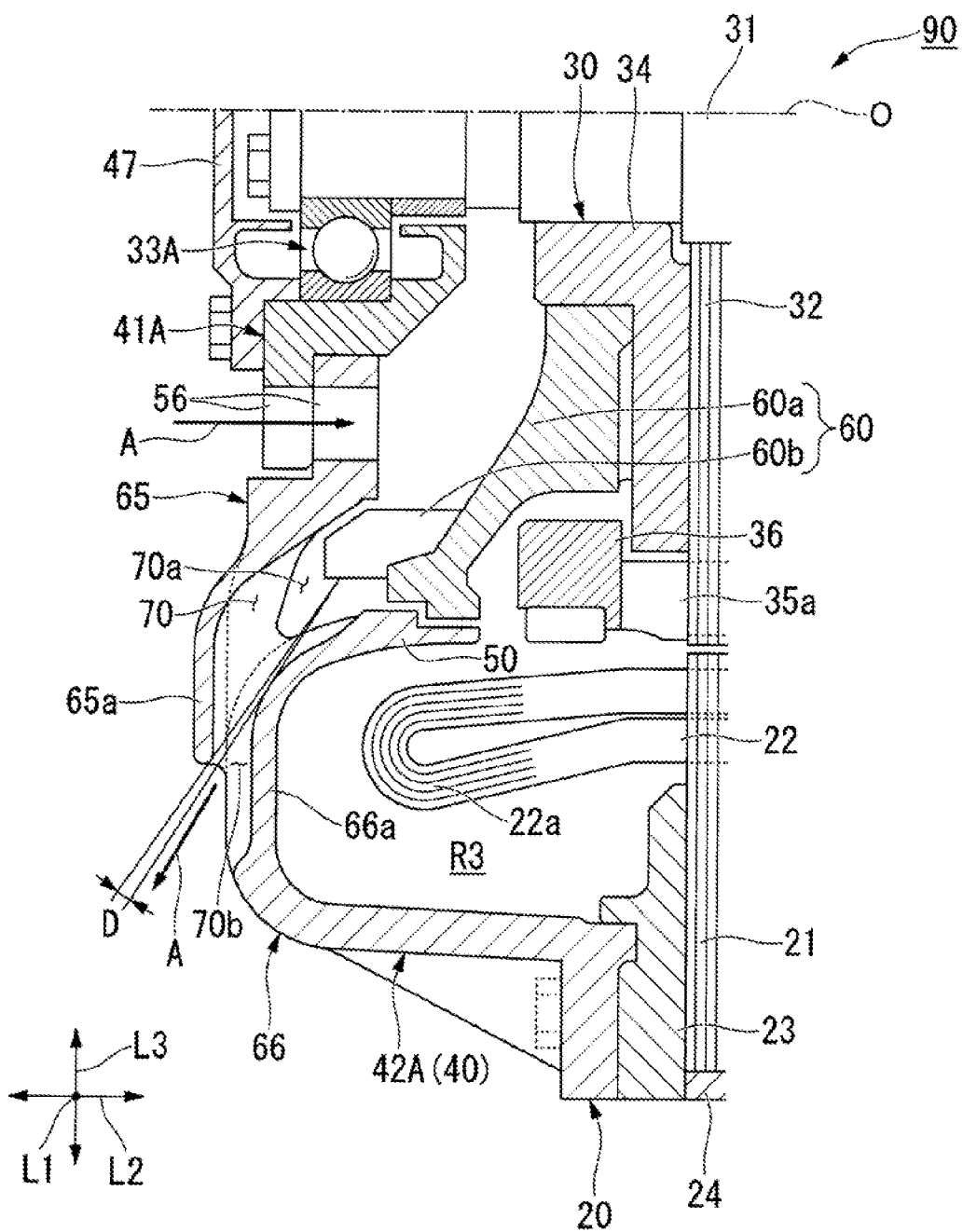
FIG. 11 is a partial cross-sectional view of a motor according to a third embodiment, illustrating an enlarged cross section around a discharge channel.
Figure 12:
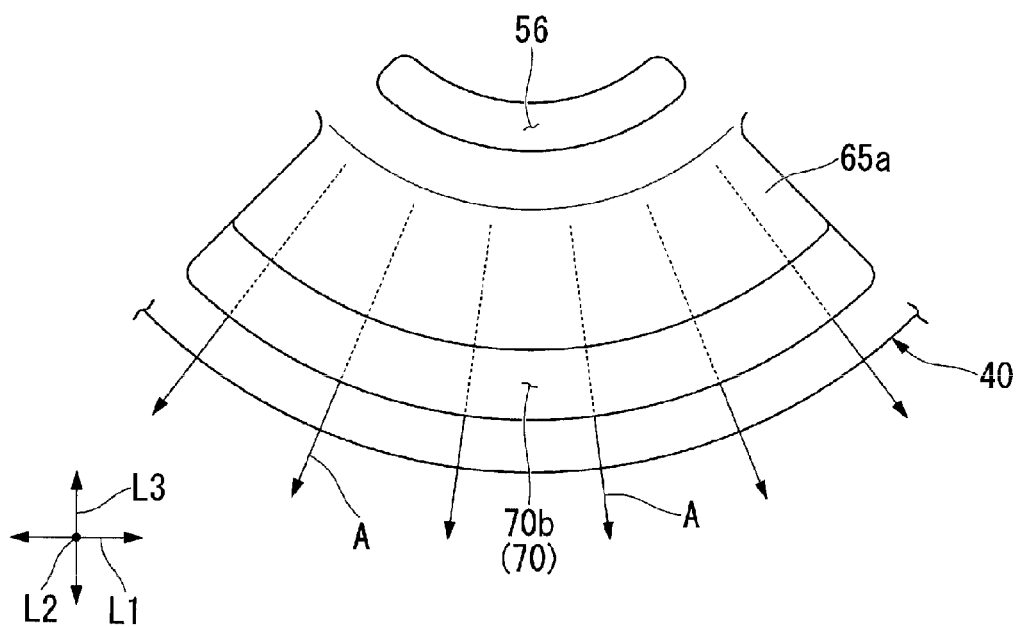
FIG. 12 is a side view of an air inlet port and the discharge channel shown in FIG. 11 as viewed from the side opposite to the driving side.

According to a motor 90 in this embodiment, the guide wall 65a of the first housing 65 and the thin wall portion 66a of the second housing 66 extend further downwardly by the same length in the up-down direction L3, as compared to FIG. 6, as illustrated in FIGS. 11 and 12. In the case of the example shown in FIG. 11, the wall components 65a and 66a extend to such an extent that the tip of the guide wall 65a is adjacent to the outside of the stator coils 22 in the left-right direction L2.
[Operation and Advantage]

According to the motor 90 in this embodiment, the discharge channel 70 becomes longer than the discharge channel 70 in the first embodiment such that the position of the exit port 70b can be located further away from the impellers 60b of the fan 60. In this case, the diffusion angle D of the wind noise can further decrease, or become close to zero. Accordingly, the direct wind noise generated from the impellers 60b can be reduced to substantially zero, wherefore reduction of noise is further improved.

According to this embodiment, the ribs 81 may be provided between the guide wall 65a and the thin wall portion 66a to combine these components 65a and 66a via the ribs 81 into one body similarly to the second embodiment.

Fourth Embodiment

A fourth embodiment is hereinafter described.

This embodiment is different from the third embodiment in that the guide wall 65a of the first housing 65 and the thin wall portion 66a of the second housing 66 extend to reach the outermost area, in the radial direction, of the casing 40.

The parts in the fourth embodiment similar to the corresponding constituent elements in the third embodiment are given similar reference numbers, and the same explanation of these parts is omitted.
[Structure of Motor 100]

Figure 13:
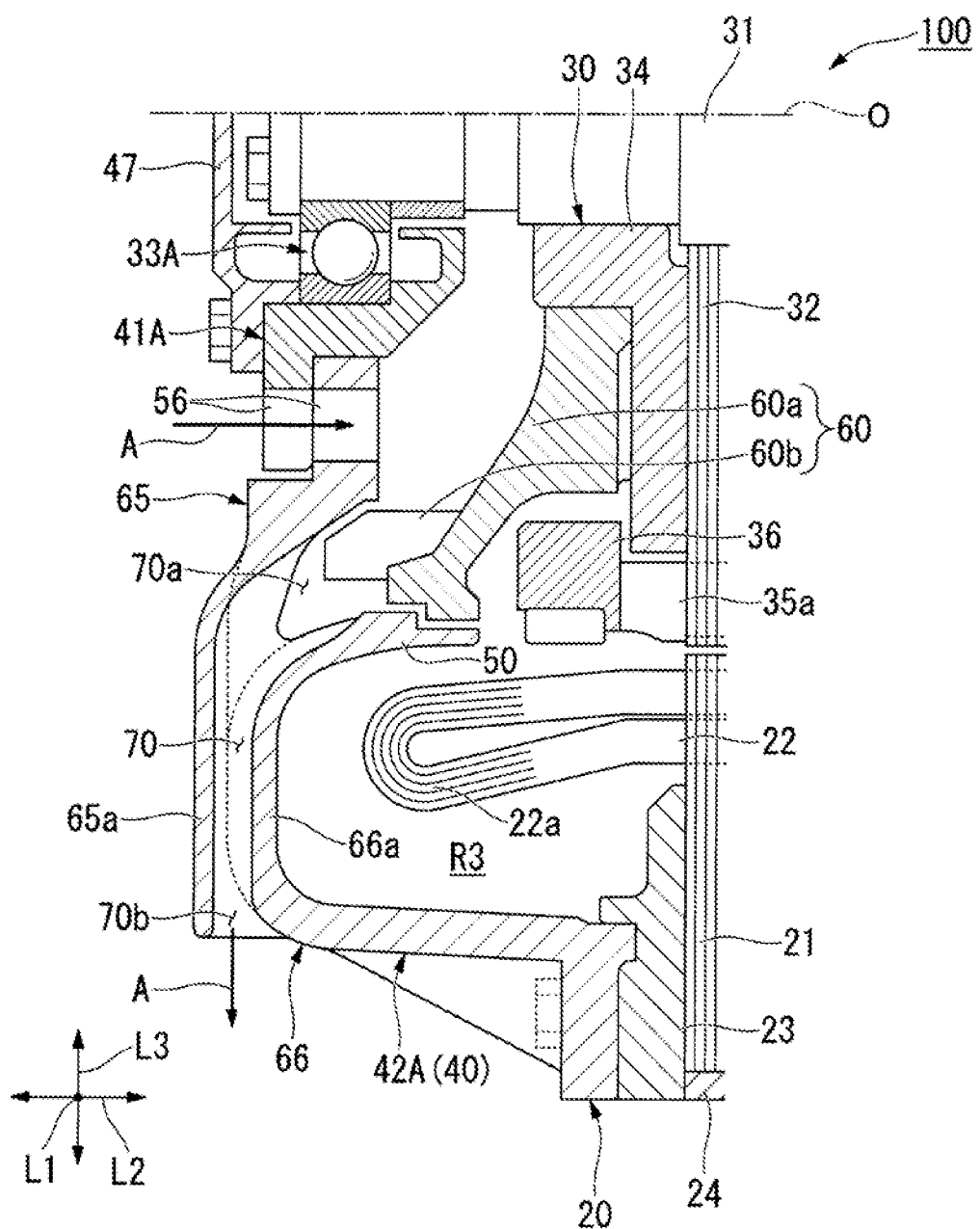
FIG. 13 is a partial cross-sectional view of a motor according to a fourth embodiment, illustrating an enlarged cross section around a discharge channel.
Figure 14:
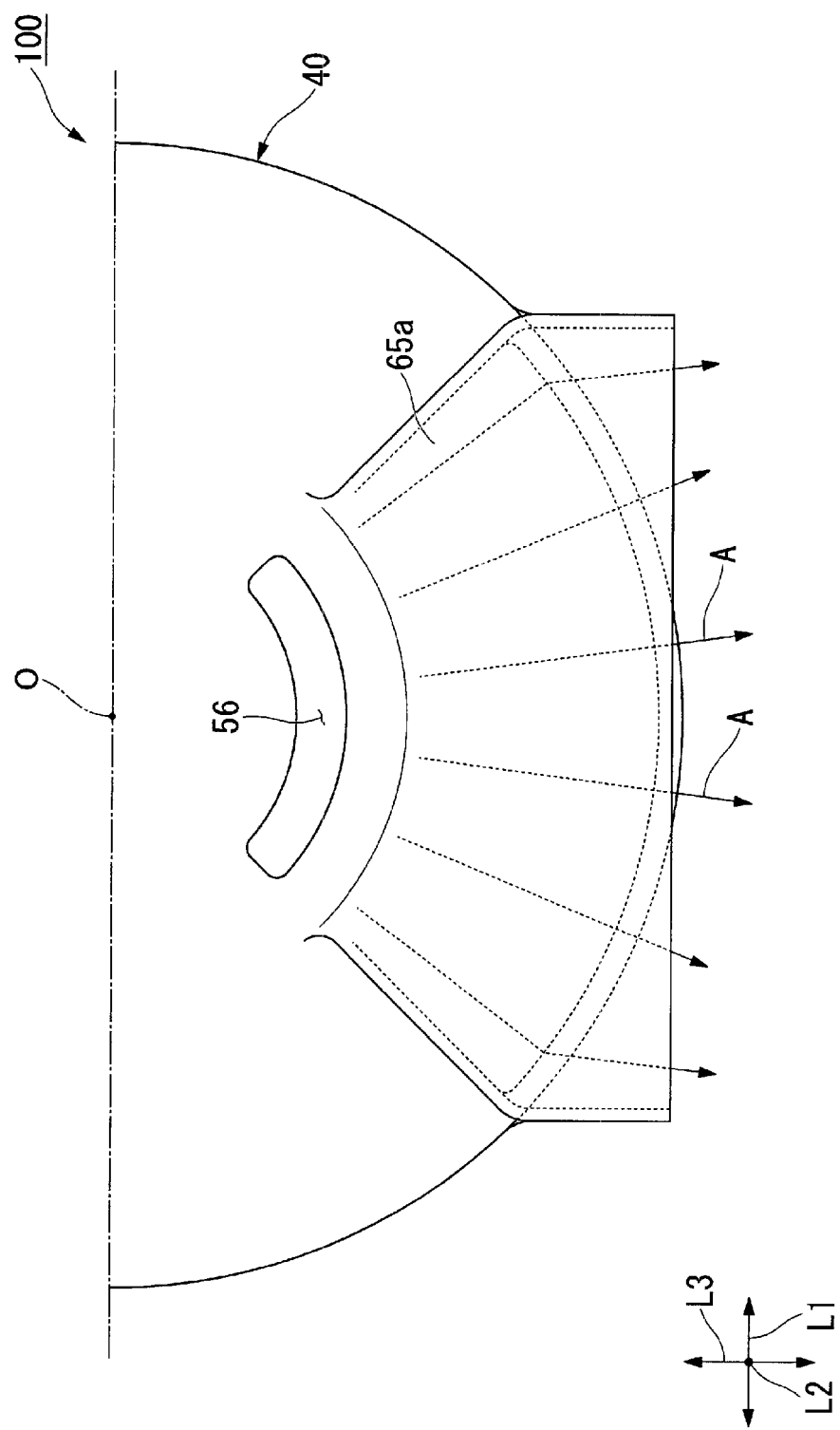
FIG. 14 is a side view of an air inlet port and the discharge channel shown in FIG. 13 as viewed from the side opposite to the driving side.

According to a motor 100 in this embodiment, the thin wall portion 66a of the second housing 66 further extends in the downward direction and reaches the outermost area, in the radial direction, of the casing 40 as illustrated in FIGS. 13 and 14. On the other hand, the guide wall 65a of the first housing 65 further extends in the downward direction in parallel with the thin wall portion 66a in a similar manner, and reaches the outermost area of the casing 40 in the radial direction in such a condition as to cover the thin wall portion 66a from the outside in the left-right direction L2.

According to this embodiment, the tip of the guide wall 65a is configured to extend straight in the front-rear direction L1. Accordingly, in the case of the example shown in the figures, the area of the tip of the guide wall 65a positioned on both sides in the circumferential direction does not face the thin wall portion 66a, wherefore the outside air A in this area is guided only by the guide wall 65a. However, the embodiment is not limited to this example. For example, an opposed wall portion may be projected downward from the second housing 66 so that the opposed wall portion can face the area of the tip of the guide wall 65a positioned on both sides in the circumferential direction.

[Operation and Advantage]

According to the motor 100 in this embodiment, the discharge channel 70 becomes longer than the discharge channel 70 in the third embodiment. In this case, the position of the exit port 70b can be positioned further away from the impellers 60b of the fan 60, wherefore the diffusion angle D of the wind noise can be decreased to substantially zero. Moreover, the discharge direction of the outside air A can be directed downward substantially in the vertical direction. In view of these points, noise reduction can be further improved, allowing the condition of the motor 100 to become close to an ideal low-noise condition.

Similarly to the above embodiments, even in this embodiment, substantially the same cross-sectional area of the exit port 70b of the discharge channel 70 can be maintained as compared to the entrance port 70a. Particularly, the guide wall 65a and the thin wall portion 66a extend to the outermost area of the casing 40 in the radial direction, in which condition the respective lengths of the guide wall 65a and the thin wall portion 66a become larger in the circumferential direction. Thus, even when the guide wall 65a and the thin wall portion 66a approach each other in the left-right direction L2 by the length of extension of the guide wall 65a and the thin wall portion 66a, a cross-sectional area of the exit port 70b substantially equal to the cross-sectional area of the entrance port 70a can be maintained as discussed above.

Modified Example of Fourth Embodiment

Figure 15:
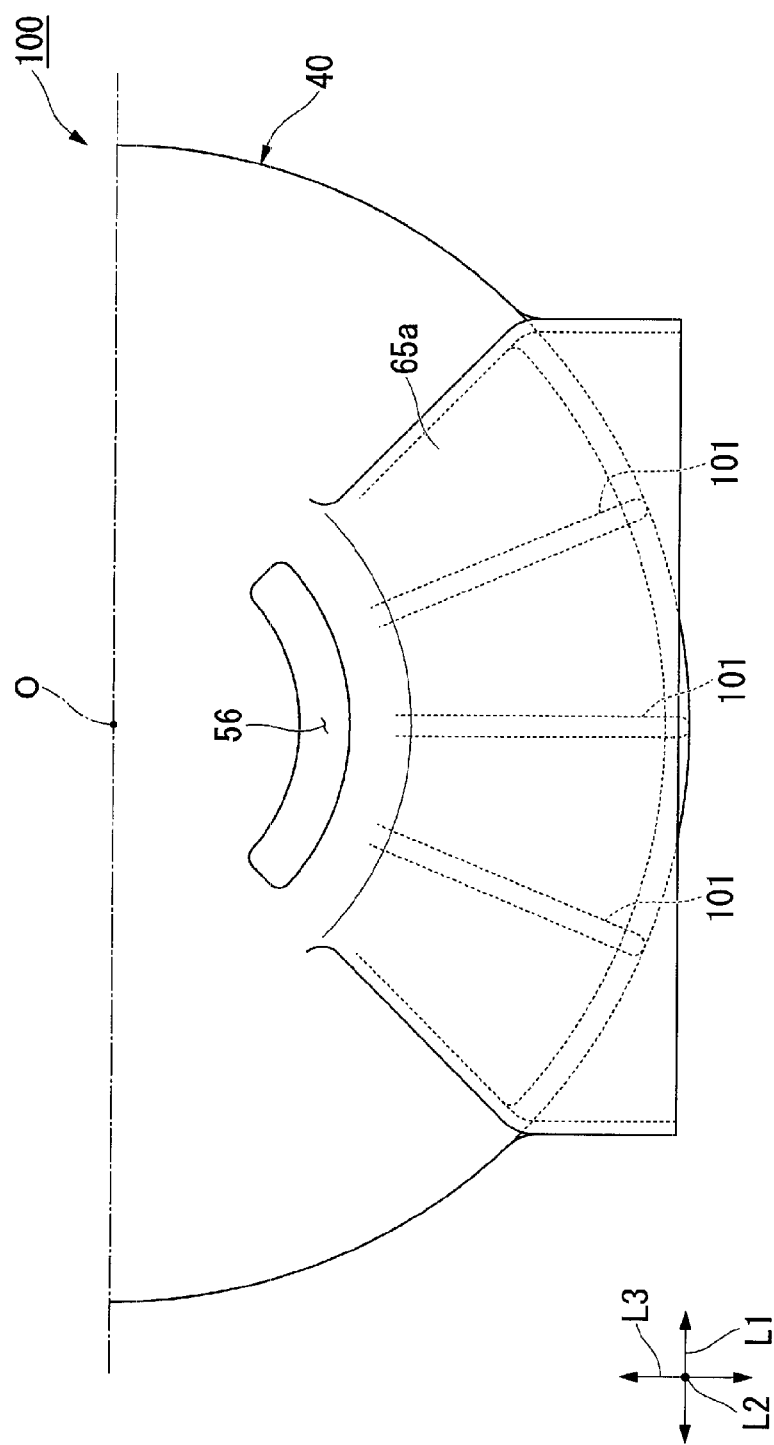
FIG. 15 is a side view illustrating a modified example of the fourth embodiment, showing a discharge channel provided with ribs as viewed from the side opposite to the driving side.

According to the fourth embodiment described above, a plurality of ribs 101 are provided between the guide wall 65a and the thin wall portion 66a to connect the two components 65a and 66a as illustrated in FIG. 15. The plural ribs 101 are vertical ribs extending in the radial direction and radially disposed around the axis O similarly to the second embodiment. In the case shown in the figure, there are provided the three ribs 101 with intervening spaces in the circumferential direction. The ribs 101 are not limited to this example. The number of the ribs 101 to be provided may be one, two, or four or larger.

When the plural ribs 101 are provided, operations and advantages similar to those of the second embodiment can be offered. Particularly, for the structure according to this embodiment where the guide wall 65a and the thin wall portion 66a extend to reach the outermost area of the casing 40 in the radial direction, it is more preferable to provide plural ribs 101 to prevent warping or deforming of the discharge channel 70.

Fifth Embodiment

A fifth embodiment is hereinafter described.

This embodiment is different from the fourth embodiment in that open holes are formed in the guide wall 65a as openings through which the outside air A is discharged.

The parts in the fifth embodiment similar to the corresponding constituent elements in the fourth embodiment are given similar reference numbers, and the same explanation of these parts is omitted.

[Structure of Motor 110]

Figure 16:
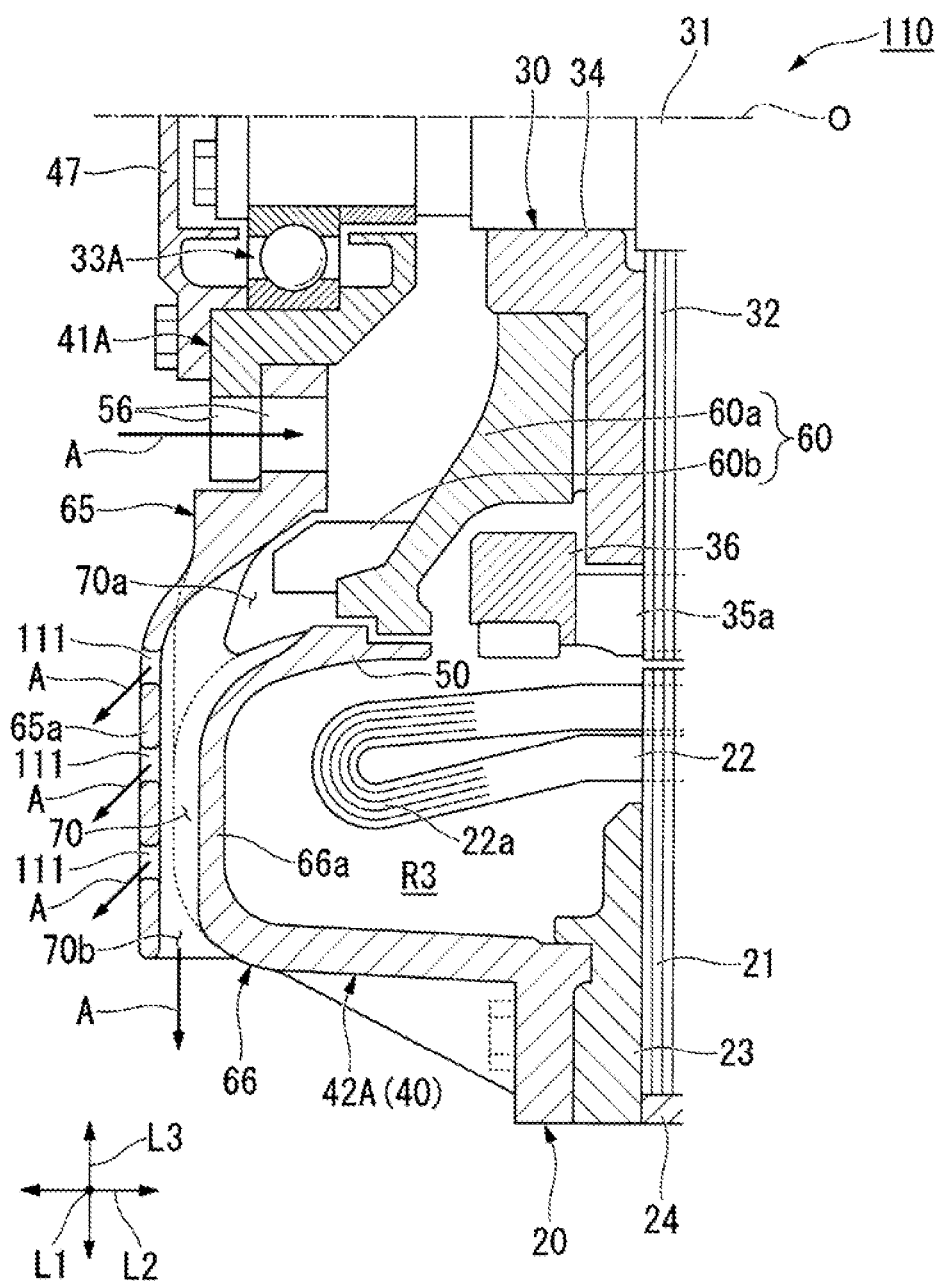
FIG. 16 is a partial cross-sectional view of a motor according to a fifth embodiment, illustrating an enlarged cross section around a discharge channel.

According to a motor 110 of this embodiment, a plurality of open holes (supplementary holes) 111 are formed in the guide wall 65a of the first housing 65 as openings through which the outside air A flowing into the discharge channel 70 is discharged to the outside before reaching the exit port 70b as illustrated in FIG. 16.

[Operation and Advantage]

According to the motor 110 in this embodiment, operations and advantages similar to those of the fourth embodiment can be offered. In addition, the outside air A can be discharged through the open holes 111 before reaching the end of the discharge channel 70. In this case, discharge of the outside air A improves, wherefore the amount of air flow can be increased. Accordingly, the cooling effect can be further improved while maintaining a low-noise condition.

Figure 17:
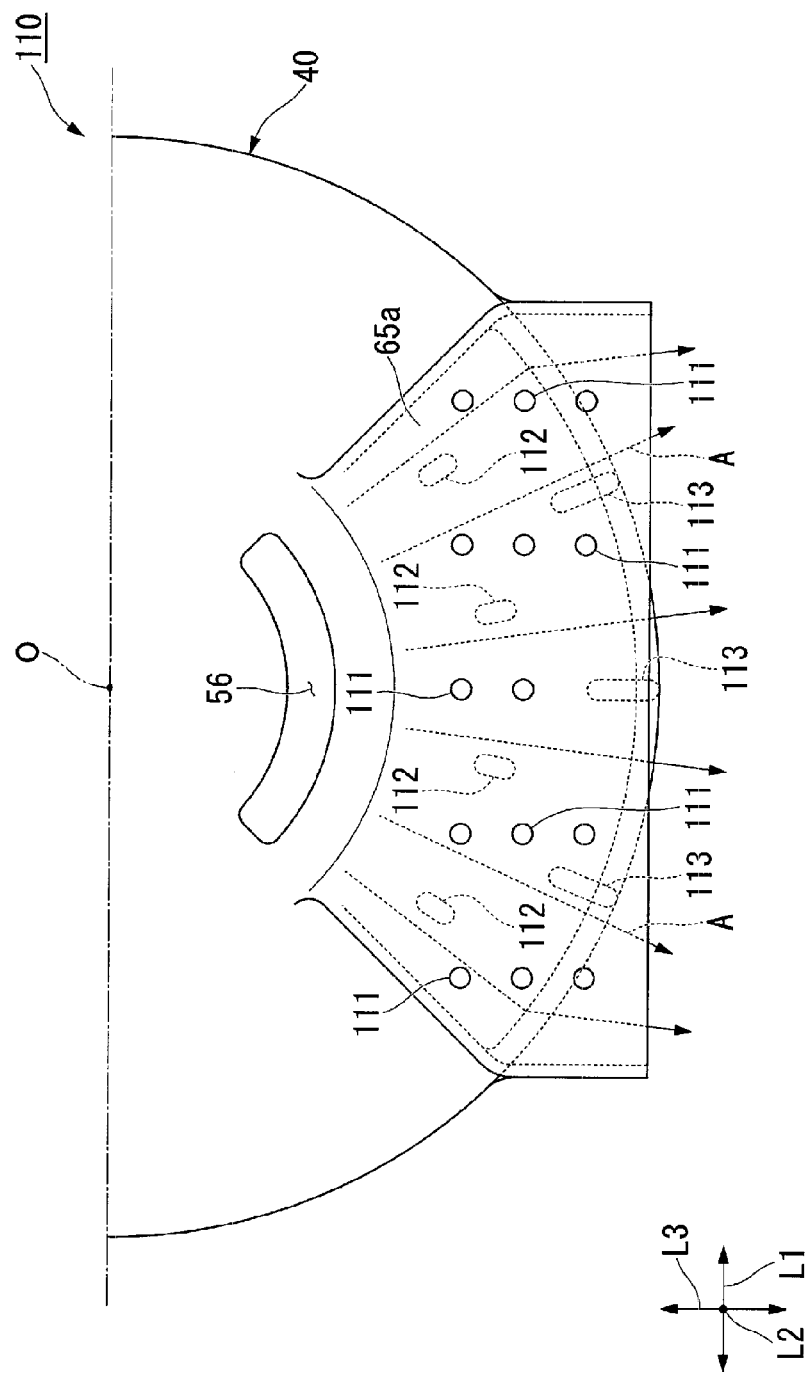
FIG. 17 is a side view of an air inlet port and the discharge channel shown in FIG. 16 as viewed from the side opposite to the driving side.

It is preferable that positioning of the respective open holes 111 in s radial direction is avoided as much as possible as illustrated in FIG. 17, for example, so as not to interrupt the flow of the outside air A which radially flows. In addition, when ribs 112 and 113 connecting the guide wall 65a and the thin wall portion 66a are provided, it is also preferable that the open holes 111 are disposed in such positions as not to overlap with the ribs 112 and 113.

The figure shows the example which includes the four ribs 112 spaced from each other in the circumferential direction at positions close to the air inlet port 56, and the three ribs 113 longer than the ribs 112 in the radial direction disposed in an area outside the ribs 112 in the radial direction and spaced from each other in the circumferential direction. However, the ribs 112 and 113 are not limited to this example.

Accordingly, it is preferable that the positions of formation and the directions of disposition of the open holes 111 are determined while considering the flow direction of the outside air A and the positions of the ribs 112 and 113. Particularly, it is preferable that the open holes 111 are formed radially outside of the position of the diffusion angle D of the discharged outside air A coming close to zero (determined based on the factors such as the shape and size of the impellers 60b of the fan 60). According to this structure, leakage of the wind noise of the impellers 60b to the outside through the open holes 111 can be prevented.

Sixth Embodiment

A sixth embodiment is hereinafter described.

This embodiment is different from the first embodiment in that the position of the air inlet port 56 formed on the side opposite to the driving side is located at a different position.

The parts in the sixth embodiment similar to the corresponding constituent elements in the first embodiment are given similar reference numbers, and the same explanation of these parts is omitted.

[Structure of Motor]

Figure 18:
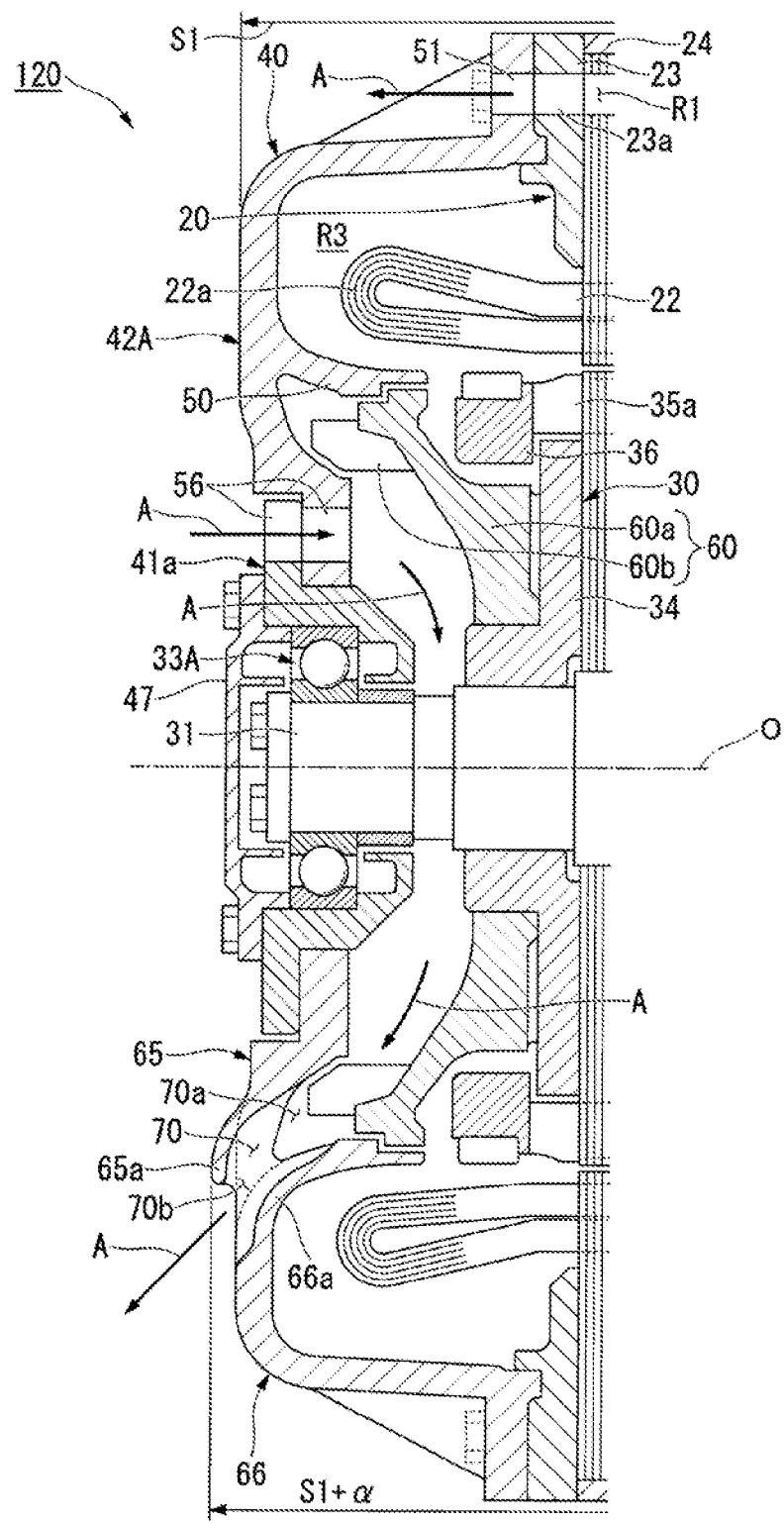
FIG. 18 is a partial cross-sectional view of a motor according to a sixth embodiment, illustrating an enlarged cross section on the side opposite to the driving side.

According to a motor 120 in this embodiment, the discharge channel 70 is so formed as to be located below the bearing 33A (railroad side), while the air inlet port 56 is so formed as to be located above the bearing 33A (vehicle body 2 side) as illustrated in FIG. 18. In other words, the air inlet port 56 and the discharge channel 70 are disposed on opposite sides of the bearing 33A.

[Operation and Advantage]

According to the motor 120 in this embodiment, the fan 60 can be efficiently cooled by receiving the outside air A on the entire outer surface of the main plate 60*a* of the fan 60 during the period when the outside air A, introduced in accordance with the rotation of the fan 60, flows toward the discharge channel 70. In synchronization with this cooling, the entire area of the bearing 33A can be also efficiently cooled. Accordingly, the bearing 33A and the rotor 30 can be further effectively cooled.

Modified Example of Sixth Embodiment

The sixth embodiment described above shows the example which disposes the air inlet port 56 above the bearing 33A, and the discharge channel 70 below the bearing 33A. However, the embodiment is not limited to this example. The air inlet port 56 and the discharge channel 70 may be located at any positions as long as the air inlet port 56 and the discharge channel 70 are disposed on opposite sides of the bearing 33A.

For example, such a structure is allowed which forms the air inlet port 56 in an area limited by the axial size S1, and forms the discharge channel 70 in an area having a slight margin allowing a greater area for the axial (limit) size S1 (S1+α area). In this case, the space within the truck 3 can be more effectively utilized as an installation space, allowing a motor having higher output to be designed.

For example, an area Z shown in FIGS. 2 and 3 positioned on the back of the motor but offset from the outside diameter of the wheel 8 can provide a space utilized as a component of the motor. That is, the area Z corresponds to the foregoing (S1+α) which has a margin for the limit size. Thus, the discharge channel 70 can be formed in such a manner that the exit port 70*b* is located in the area Z for effective utilization of the area.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the motor is not limited to of the fully enclosed type discussed in the respective embodiments, but may be of an open-type motor which has the fans 60 containing the impellers 60*b*. Moreover, the motor which has a frameless structure is discussed in the respective embodiments, but may be a motor provided with a frame.

According to the respective embodiments described herein, the discharge channel 70 is disposed on the side of the case 40 opposite to the driving side. However, the discharge channel 70 may be disposed on the driving side corresponding to the other side, or on each of the driving side and the side opposite to the driving side.

Particularly, a permanent magnet type synchronous motor, which has a greater allowable temperature increase when compared with the inductive motor, includes a type which does not have the air channel R1 in the stator iron core 21 and discharges the outside air A flowing through the air channel R2 of the connecting housing 42B directly to the outside. In this case, it is more suitable to dispose the discharge channel 70 on the driving side.

Accordingly, the motor is not limited to the inductive type but may be of other various types of motors including the permanent magnet type.

What is claimed is:

1. A motor for a vehicle, comprising:
a rotor shaft configured to rotate around an axis and having opposed axial ends;
a rotor iron core fixed to the rotor shaft;
a stator iron core disposed radially outside of the rotor iron core;
a casing accommodating the rotor iron core and the stator iron core therein, and supporting the opposed axial ends of the rotor shaft via a pair of bearings such that the rotor shaft is rotatable;
an air inlet port formed in a first portion of the casing radially spaced from one of the pair of bearings; and
a fan provided between the rotor iron core and one of the pair of bearings and configured to rotate with the rotor shaft to introduce outside air into the air inlet port,
wherein
a second portion of the casing positioned outside impellers of the fan in an axial direction and in a radial direction comprises a first housing, a second housing, and a discharge channel between the first housing and the second housing through which the outside air is discharged,
the first housing comprises a guide wall extending in the axial and radial directions,
the second housing comprises a thin wall portion having a thinner wall thickness than that of adjacent portions of the second housing, and
the discharge channel is between the thin wall portion and the guide wall such that an exit port of the discharge channel is located between the thin wall portion and the guide wall.

2. The motor according to claim 1, further comprising:
a rib provided between the guide wall and the thin wall portion to connect the guide wall and the thin wall portion.

3. The motor according to claim 1, wherein
the guide wall and the thin wall portion extend in a circular-arc shape in a circumferential direction in such a manner that the discharge channel extends in a circular-arc shape in the circumferential direction.

4. The motor according to claim 1, wherein
the thin wall portion extends to an outermost area of the casing in the radial direction, and
the guide wall extends to the outermost area of the casing in the radial direction and overlies the thin wall portion in the axial direction.

5. The motor according to claim 4, wherein
the guide wall is provided with a supplementary hole through which the outside air introduced into the discharge channel is discharged to the outside.

6. The motor according to claim 1, wherein
the air inlet port and the discharge channel are disposed on opposed sides of one of the pair of bearings.

7. The motor according to claim 1, wherein
the guide wall and the thin wall portion approach each other from an entrance port of the discharge channel to the exit port of the discharge channel.

8. An enclosed vehicle motor located within a portion of a case having at least one air flow passage formed within the case and extending over the portion of the case enclosing the vehicle motor, the vehicle motor including a drive shaft extending between a pair of bearings supported by first and second opposed housings forming at least part of the case, comprising:

an inlet passage extending through the first housing;

a shroud extending from the second housing and cooperating with an additional portion of the second housing to form a discharge passage extending through the second housing between the shroud and the additional portion, wherein the additional portion has a reduced thickness along the discharge passage including at an exit port of the discharge passage; and an air passage extending within the case from the inlet passage to the discharge passage.

9. The vehicle motor of claim 8, further including a fan disposed at least partially within the air passage.

10. The vehicle motor of claim 9, wherein the discharge passage has an entrance port in fluid communication with the air passage located distally of the exit port.

11. The vehicle motor of claim 10, wherein the fan includes a rotatable body and at least one impeller thereon, the impeller positionable to move past the entrance port of the discharge passage during rotation of the fan.

12. The vehicle motor of claim 11, wherein the motor is secured below a vehicle body, and the discharge passage extends in a direction away from the vehicle body.

13. The vehicle motor of claim 12, wherein a line of sight from the impeller intersects the shroud of the discharge passage.

14. The vehicle motor of claim 12, wherein the discharge passage, at the exit port, extends perpendicular to an axis of the drive shaft.

15. The vehicle motor of claim 10, wherein the case has a width extending in a direction of an axis of the drive shaft, and a largest width of the case measured across the shroud is less than or equal to a largest width of the case measured across a component of the case other than the shroud.

16. The vehicle motor of claim 10, wherein the discharge passage narrows from the entrance port to the exit port.

17. The vehicle motor of claim 16, wherein a cross section of the discharge passage is the same from the entrance port to the exit port thereof.

18. The vehicle motor of claim 8, further including at least one rib extending across the discharge passage from the shroud to the additional portion of the second housing.

19. A railway vehicle having an enclosed motor located within a portion of a case and at least one air flow passage formed within the case and extending over the portion of the case enclosing the motor, the motor including a drive shaft extending between a pair of bearings supported by first and second opposed housings forming at least part of the case, comprising:

an inlet passage extending through the first housing;

a shroud extending from the second housing and cooperating with an additional portion of the second housing to form a discharge passage extending through the second housing between the shroud and the additional portion, wherein the additional portion has a reduced thickness along the discharge passage including at an exit port of the discharge passage;

an air passage extending within the case from the inlet passage to the discharge passage; and a vehicle body to which the motor is attached to be carried below a floor of the vehicle body via a truck.

20. The railway vehicle of claim 19, wherein the discharge passage extends away from the vehicle body floor.

* * * * *